United States Patent [19]

Capewell et al.

[11] Patent Number: 4,728,866
[45] Date of Patent: Mar. 1, 1988

[54] POWER CONTROL SYSTEM

[75] Inventors: Dennis Capewell, Penllyn; Donald Hausman, Emmaus; Aaron Jungreis, Allentown; Joel S. Spira, Coopersburg, all of Pa.

[73] Assignee: Lutron Electronics Co., Inc., Coopersburg, Pa.

[21] Appl. No.: 904,874

[22] Filed: Sep. 8, 1986

[51] Int. Cl.[4] .......................................... H05B 37/00
[52] U.S. Cl. ................................... 315/224; 315/194; 315/199; 315/DIG. 4
[58] Field of Search ................. 315/DIG. 4, 194, 199, 315/208, 224

[56] References Cited

U.S. PATENT DOCUMENTS

| | | | |
|---|---|---|---|
| 3,496,451 | 2/1970 | Duncan | 315/DIG. 4 |
| 3,668,434 | 6/1972 | Brungsberg | 315/DIG. 4 |
| 3,684,919 | 8/1972 | Cramer | 315/DIG. 4 |
| 4,570,107 | 2/1986 | Lee | 315/DIG. 4 |

*Primary Examiner*—Harold Dixon
*Attorney, Agent, or Firm*—Ostrolenk, Faber, Gerb & Soffen

[57] ABSTRACT

A power control system for gas discharge lamps and other loads. According to a preferred embodiment, the system includes a main divertor in series or parallel with the load, and a variable divertor, which includes a controllably conductive device controlled by a control circuit, the variable divertor being selectively inserted in series with the load during each half cycle of the output voltage signal. The system obtains an improved load voltage waveform giving superior performance under reduced power output conditions. This system can be applied to a fluorescent lighting circuit having a plurality of conventional ballasts, achieving a dimming ratio of greater than 4 to 1, and can also be applied to other gas discharge lamp circuits, including high intensity discharge lamp circuits, to incandescent lamps, and to motors such as fan motors. It can further be applied to control the power supplied to solid-state switching units, including those having capacitive inputs. The system produces a waveform having no sharp voltage changes, and thus virtually no audible noise emanates from the load. Radiated and conducted EMI are significantly lower than with existing controls. The advantageous waveform is generated while maintaining an efficiency greater than about 95 percent.

62 Claims, 28 Drawing Figures

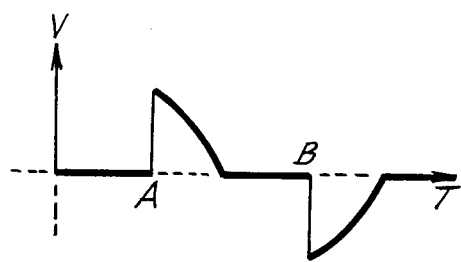
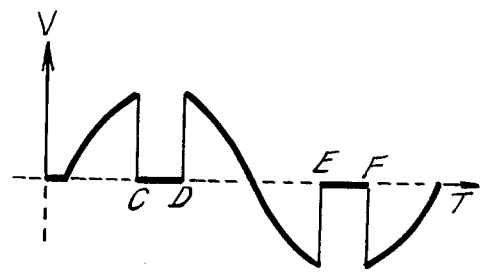
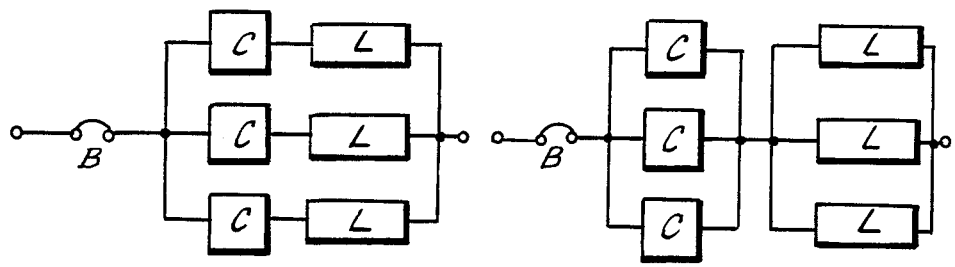
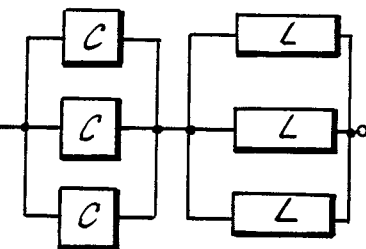
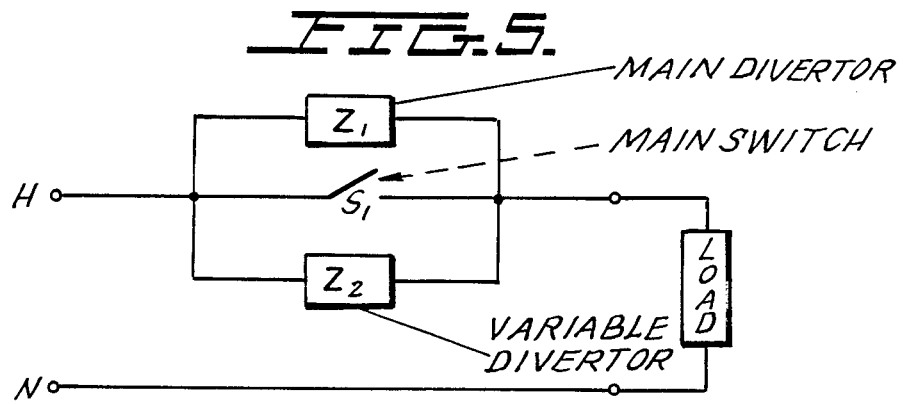

FIG. 8.
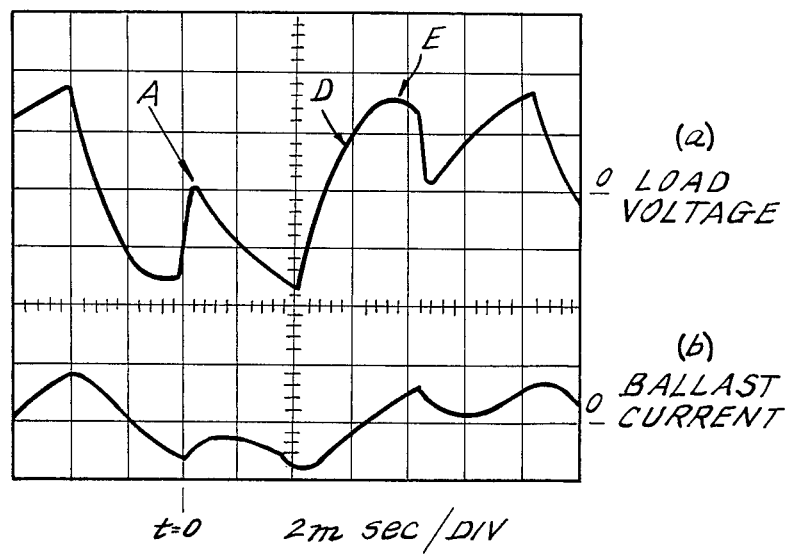
(a) 0 LOAD VOLTAGE
(b) 0 BALLAST CURRENT
t=0    2m sec/DIV
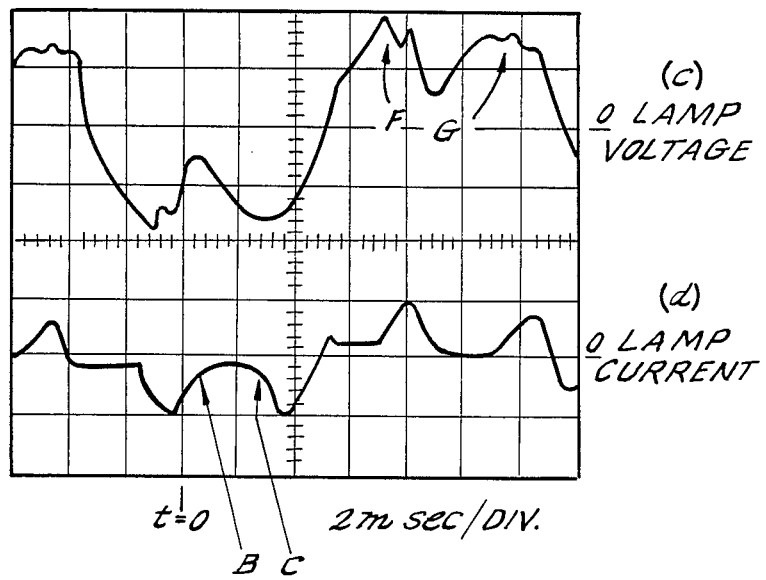
(c) 0 LAMP VOLTAGE
(d) 0 LAMP CURRENT
t=0    2m sec/DIV.

FIG-9.
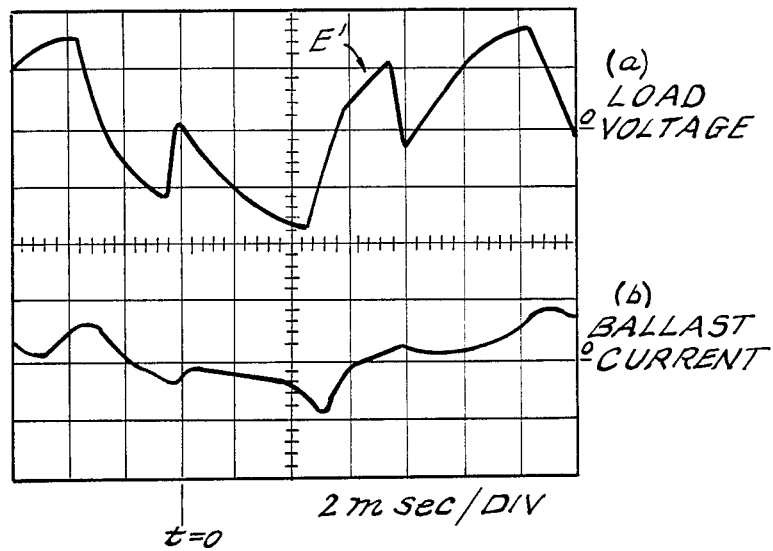
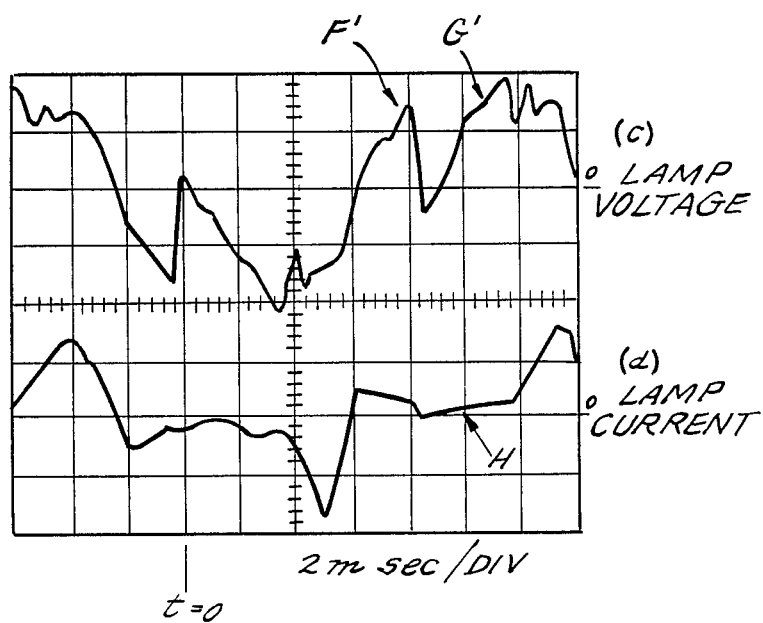

FIG. 10
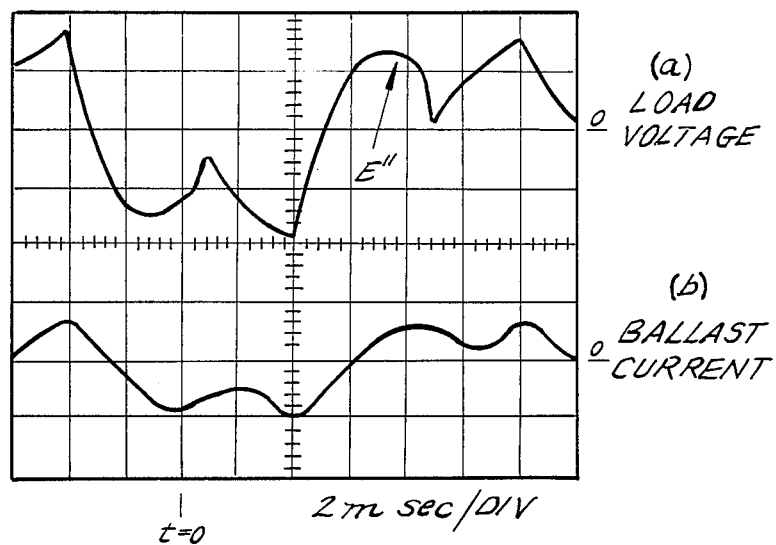
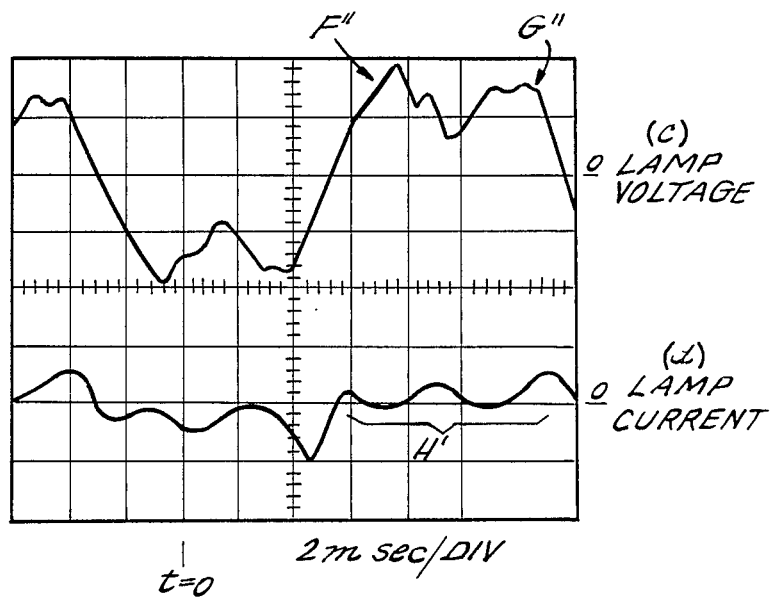

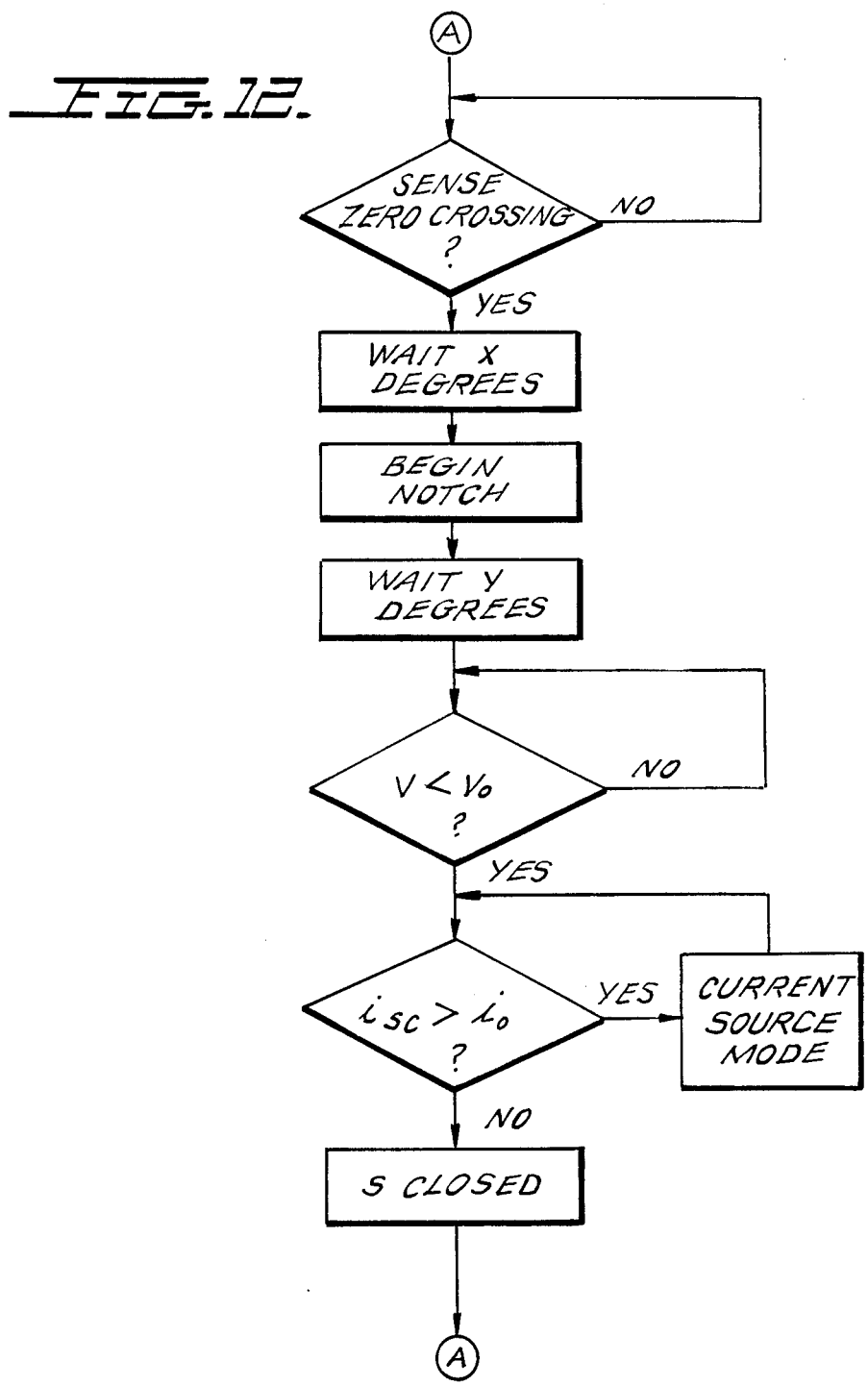

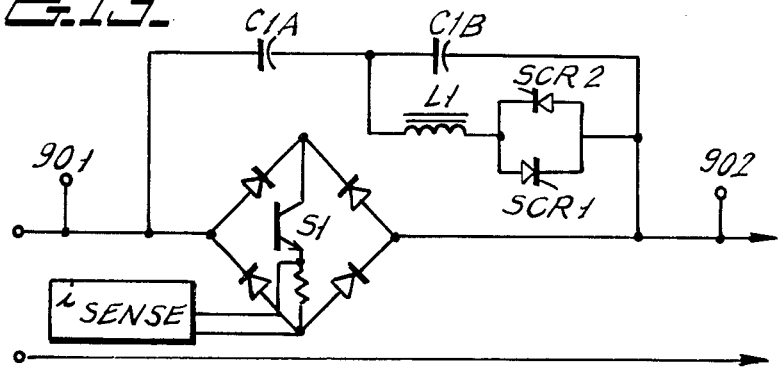
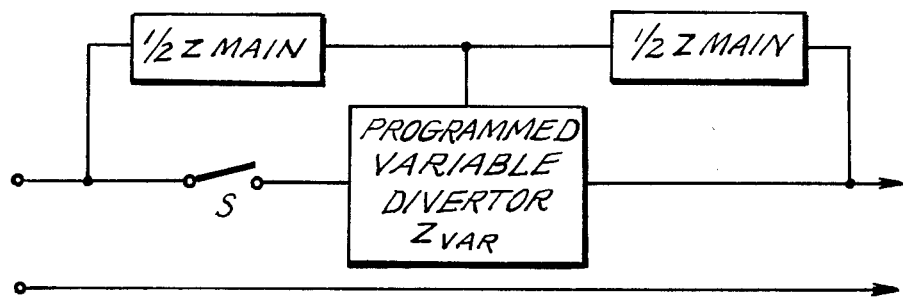
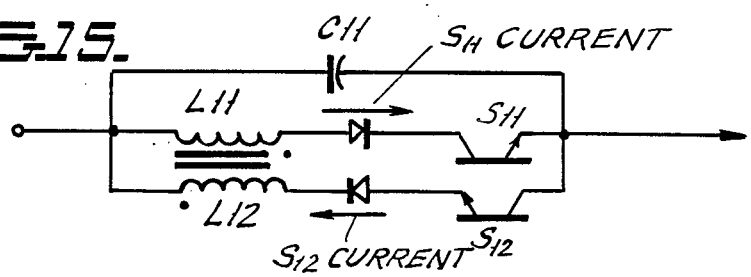
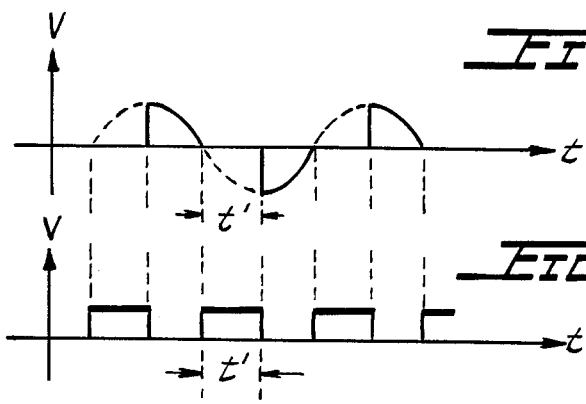

BALLAST INPUT VOLTAGE

BALLAST INPUT CURRENT

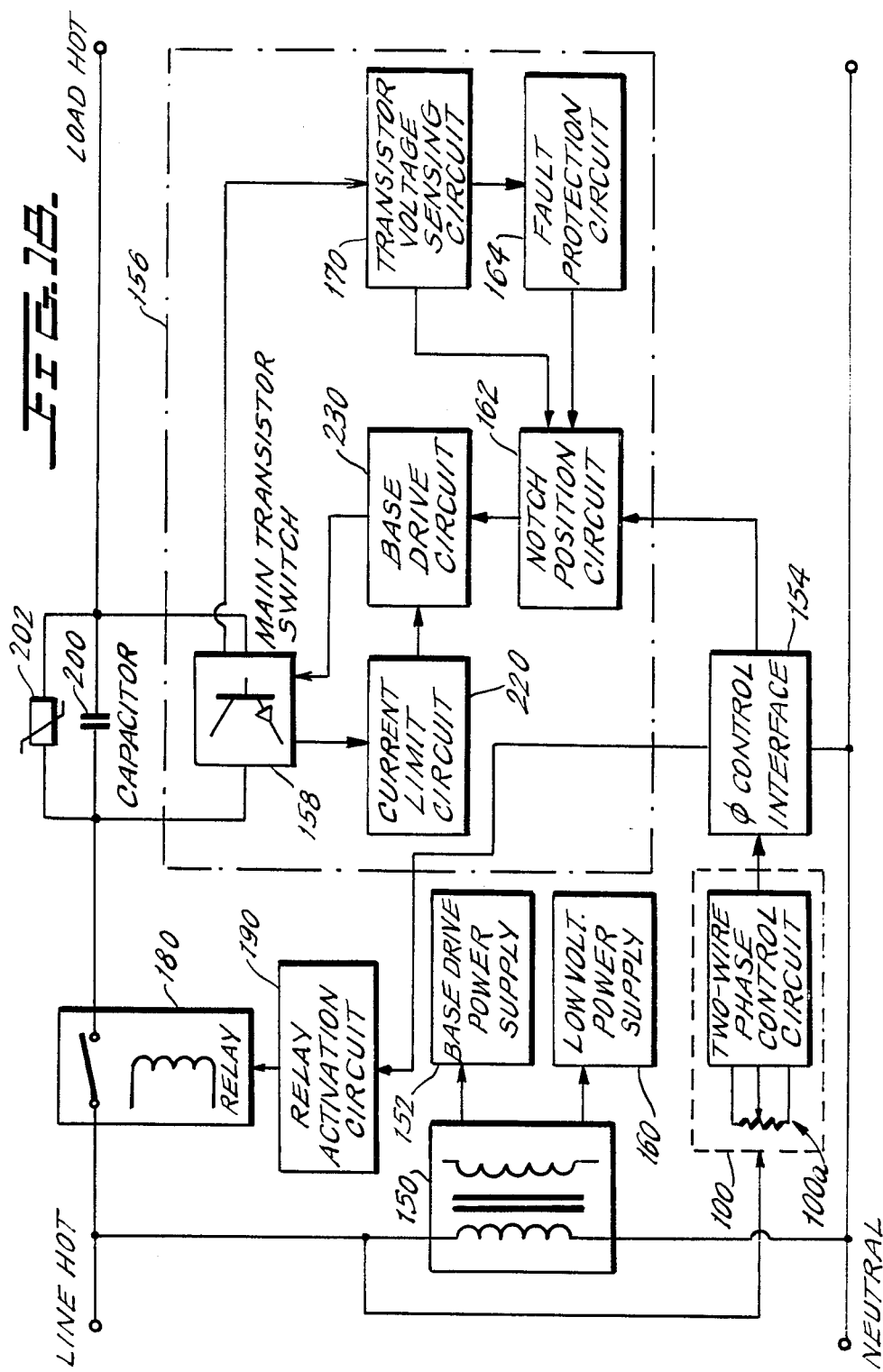

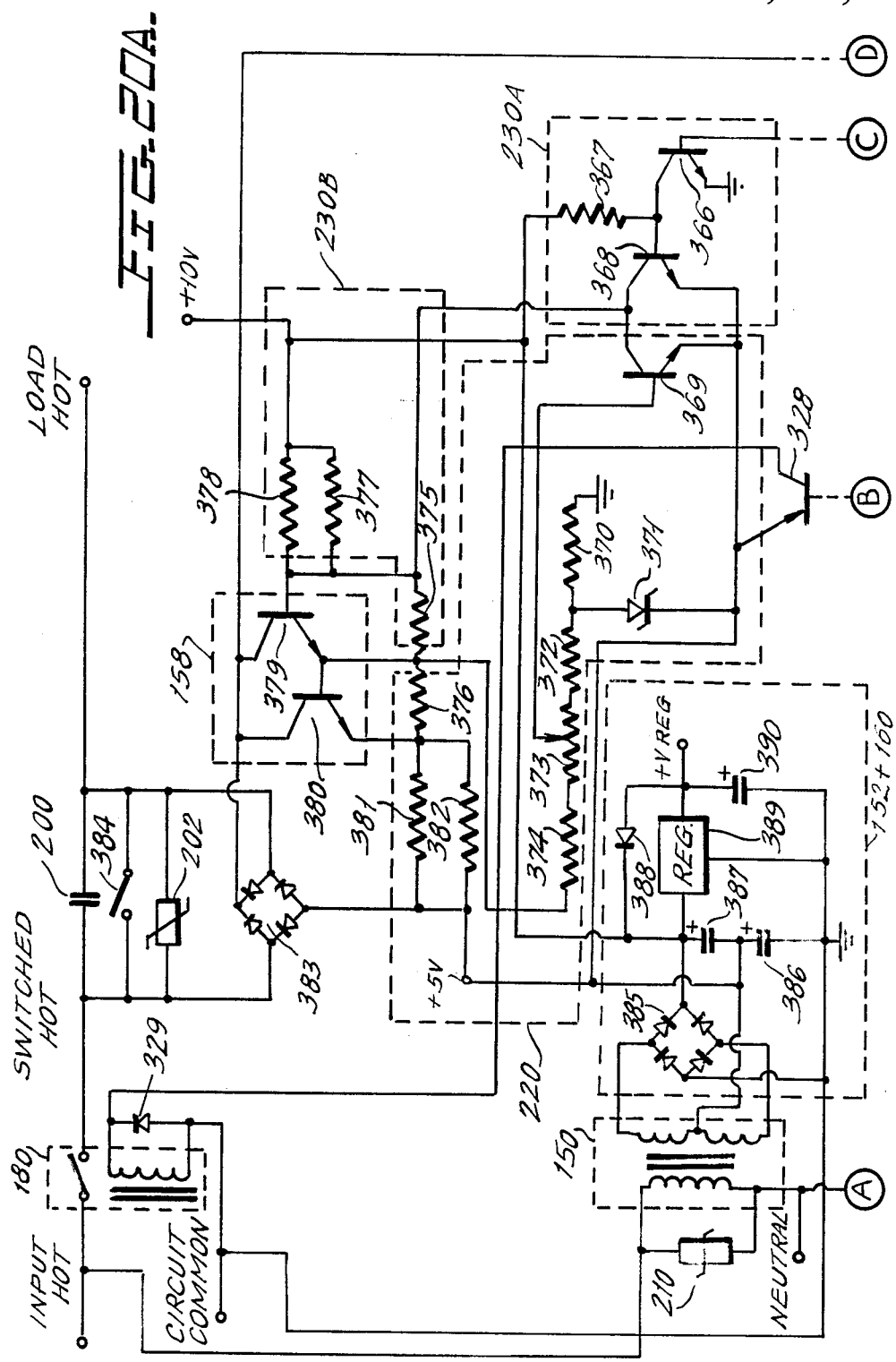

POWER CONTROL SYSTEM

BACKGROUND OF THE INVENTION

This invention relates to a power control system for gas discharge lamps, motors (fan motors for example), incandescent lamps, solid-state-ballasted lamps, capacitive input lighting, and other loads similar to the above, and more particularly to a system having a control circuit in which a main divertor and a variable divertor are selectively inserted in series or parallel with the load during each half-cycle of the output voltage waveform. The invention also relates to a power control system broadly defined as comprising such a control circuit together with a load.

The present invention is an improvement on the inventions described in U.S. Pat. No. 4,350,935 dated Sept. 21, 1982, in the name of Joel S. Spira et al., and assigned to the assignee of the present invention; and also U.S. Pat. No. 4,527,099 dated July 2, 1985 in the name of Dennis Capewell et al., and assigned to the assignee of the present invention, the disclosures of which are expressly incorporated herein by reference. These inventions address the problem of power control, including dimming, of loads such as gas discharge lamps. The present invention is also applicable to other types of loads as discussed further below.

The above-mentioned prior art control circuits for gas discharge lamps achieve very good results. Nevertheless, their dimming range is only from 100% to about 40%. Such a range is appropriate for many applications such as general lighting reduction or peak demand reduction, or even daylight compensation. However, for applications in areas such as conference rooms or video display terminal (VDT) areas, the required dimming range is greater. Conference rooms, for example, may be used for discussion, in which a high level of lighting is needed so that persons can see each other, or for a slide presentation, which only requires the amount of light necessary for writing. VDT areas may require a high level of lighting for reading detailed written material and then quite a low level for usage of the terminal, such that glare is held to a minimum. To adapt to such widely varying needs, a dimming range from 100% down to well below 25% is necessary.

Thus, one object of the invention is to provide such a dimming range. The invention achieves this range, even with conventionally ballasted circuits, through the use of a novel circuit which produces a specifically adapted load voltage waveform.

Another object of the invention is reduction of the audible noise that is produced by the load itself when controlled by existing types of control circuit. Most existing control circuits, such as the phase control or notch control types, produce abrupt changes in load voltage. This is because the semiconductor switches, which produce the load voltage waveform, alternate between two operating modes for minimum power dissipation and thus maximum efficiency.

Referring to FIG. 1, there is seen a graph of voltage versus time showing the load voltage output of a dimmer circuit of the phase control type. In this circuit, it is seen that the circuit alternates between a high impedance state, in which zero line voltage is delivered to the load, and a zero impedance state, in which full line voltage is delivered to the load. These abrupt voltage transitions are seen at points A and B in FIG. 1. FIG. 2 shows the output load voltage versus time of a prior art dimmer circuit of the notch control type. Again, abrupt voltage changes are seen at points C, D, E, and F. These abrupt changes in load voltage produce audible noise in magnetic as well as capacitive components, and moreover in the tungsten filaments of incandescent lamps. Magnetic components produce the noise in most conventional gas discharge lamp systems, low-voltage incandescent lamp systems (which contain a step-down transformer) and fans. Some gas discharge lamp circuits for use in nondomestic areas, and solid-state ballasts, can be considered as capacitive inputs. It was found, experimentally, that abrupt changes in voltage (high dv/dt) were symptomatic of a high acoustic noise system. Further, the perceived acoustic noise level was found to be proportional to the magnitude of dv/dt in magnetic components, capacitive components, and incandescent lamps. Consequently, one of the objects of this work was to develop a power control system which produced a waveform with low dv/dt value. The present invention succeeds in producing such a waveform, while at the same time still allowing dimming to a much lower level than possible with prior systems, and accomplishing other desirable objects as well.

Another important object of the invention is reducing conducted and radiated RFI. This invention will be used in modern offices containing computers, word processors, and other sensitive electronic equipment. This invention produces virtually no RFI as there are no abrupt changes in load voltage. Thus, this system can be directly connected to existing wiring without any special precautions being necessary. Installation is therefore much less complicated than in previous systems; in fact, an electrician can install it "right off the shelf."

One prior art arrangement that attempts to provide a control system for an electrical load, whose output does not have any large voltage transients, is disclosed in U.S. Pat. No. 4,507,569 to Hess, II. This patent discloses a driver that can be used with a control system to control the operation of one or more gas discharge lamps. The driver has two modes of operation, A and B. In mode A, energizing voltage is applied from the AC power supply to the load L. In mode B, energizing voltage from the power supply is removed from the load L. The driver remains in mode B until the potential difference between the AC supply voltage and the voltage across load L falls below a predetermined value, at which time total energizing power is reapplied to load L and the driver enters mode A again. See column 4, line 60 to column 5, line 15.

As illustrated in FIG. 2G of Hess, II, the portion of the half-cycle during which the driver is in mode B becomes quite large at low power output levels and the output voltage is relatively close to zero for much of this period. Thus, there is a tendency for the arc current in the lamps to decay and the lamps to deionize, which will cause instability in the lamps and limit the lowest light output attainable. The present invention is intended to provide a waveform that avoids this disadvantage.

A further object of the invention is the maintenance of equal lamp-to-lamp lumen output (i.e. good balancing) in the multiple-lamp and multiple-ballast circuits for which it is intended. It is possible in conventional circuits to lower the average light output by causing some of the lamps to drop out while others remain bright; however, this is not desirable for several reasons:

(a) The lighting of the room will be spotty, having areas where light level is far too low and others where light level will be too high for the work being done there. (b) The lamps that have dropped out are still partially energized and may be damaged by being maintained in the glow discharge state. (c) Objectionable flickering may occur if the lamps are going on and off at a fast rate. The invention provides smooth and relatively good balancing down to the minimum light level.

A further object of the invention is to allow dimming of lamps operated on ballasts from different manufacturers on the same circuit, with the maintenance of equal lamp-to-lamp lumen output.

Another important obJect is to maintain the efficiency of the lighting system. For this type of power control it is advisable to achieve high efficiency of the power controller, which is generally defined to be greater than about 95%. High efficiency is necessary because (a) the power control must run at a relatively low temperature in order to be reliable, and a low-efficiency design would result in either an unreliable (hot) control unit, or one that is so large and expensive that it would not be commercially feasible; and (b) low efficiency wastes energy.

One prior art arrangement that attempts to provide an efficient power control device for lighting loads is disclosed in U.S. Pat. No. 4,352,045 to Widmayer. This patent discloses a current control system in which a shunt capacitor is provided across a load to provide an alternate current path for preventing the abrupt interruption of the load current when a main control transistor is turned off. See column 8, lines 19–23. As illustrated in FIGS. 3(a)–(c) of that patent, the main control transistor is turned off at a particular point during each half-cycle, and then the output voltage returns rapidly to zero, although not instantaneously because of the shunt capacitor, and remains at about zero until the beginning of the next half-cycle, at which time the main control transistor is turned back on again. Thus, the output voltage is at or close to zero for much of the time after the main control transistor is turned off. This will cause the arc current in the lamp to have a low value during this period. It also increases the tendency of the lamp to deionize, which will limit the dimming range.

If the capacitance of the shunt capacitor in Widmayer were chosen to cause the output voltage to swing to the opposite polarity, as in the intended waveform of the present invention, the output voltage would not then return to zero before the beginning of the next half-cycle. Thus, turning on the main control transistor at the beginning of the next half cycle would cause a large voltage transient with a high dv/dt which would again cause audible noise and radio frequency interference (RFI). Therefore, the waveforms and circuits disclosed in the Widmayer patent have disadvantages that the present invention is intended to avoid.

Another important object accomplished by the system is to permit paralleling of power control modules. To handle control of lighting in small conference rooms, offices and the like it is necessary to size the power control module for about 10 lamps. However, if larger areas containing 20 to 30 lamps, for example, are in need of light control a conventional system would require expensive rewiring to break up the larger load into 10-lamp packets for connection to each power controller. The present circuit does not require such rewiring. Instead it is only necessary to connect the power controllers in parallel according to load size without rewiring.

FIG. 3 illustrates such a conventional wiring arrangement. Each controller unit C is required to be wired in series with a load L, for example comprising 10 lamps, the load L not exceeding the rated load of the controller C. The controllers C receive their power from the circuit breaker B. FIG. 4 illustrates a wiring arrangement in which the present invention may be employed. It is not necessary to connect each controller C with only one respective load. Rather, all of the loads L, which, for example, may each consist of 10 lamps, may be connected in parallel. Similarly, all of the controllers C may also be connected in parallel. Thus, installation does not require any rewiring of the loads. This is particularly useful in renovations of existing installations.

It is a further object of the invention to provide for secondary dimming, fed by a primary wide-area dimmer, wherein the primary dimmer may be, for example, one of those disclosed in U.S. Pat. No. 4,350,935 or U.S. Pat. No. 4,527,099.

Often office areas are laid out with a central area and peripheral offices or conference rooms. Usually the lighting for this whole area is fed from one lighting circuit. However, it is usually not desirable to dim the central area as greatly as the offices or conference rooms. Accordingly, a control module according to the invention can be put on the lights for each office and one of the above-mentioned wide-area dimmers can be put on the overall lighting circuit. The result will be that the open central area will have a dimming range of about 100% to about 40%, whereas the offices will dim further, down from 40% to about 10%. This is a very desirable feature for retrofit situations.

All of these objects are accomplished through the use of the novel power control circuit as described below. The disclosed embodiments of the invention include an effective divertor arrangement which modifies the load voltage waveform, resulting in much better dimming performance, particularly when feeding a plurality of ballasts. The load voltage waveform has no fast transitions, which results in low EMI and low audible noise production in both the lamp and the ballast. Power control operation is significantly better in several situations: (a) In situations involving a plurality of loads, better balancing is achieved. (b) There is less ripple in the load current. See descriptions of FIGS. 13, 13A and 13B below. (c) The system is simpler, as units can be paralleled, and as programmed the unit handles load splitting automatically.

A power control system according to one aspect of the invention includes a control circuit having an input terminal and an output terminal, the control circuit including a switching element interconnecting the input and output terminals, main energy diverting means connected for diverting energy to the output terminal; variable energy diverting means connected to the output terminal for diverting a controllable amount of energy to the output terminal; and means for controlling the switching element and the variable energy diverting means; the variable energy diverting means being activated by the control means to divert energy during a controllable period of time while the switching element is off, for controlling the output waveform of the output AC voltage.

An advantageous power control system may also comprise a control circuit having input and output terminals, the control circuit including a switching element having a fully conducting state; and variable energy diverting means which can divert variable amounts of energy to the output terminals when the switching element is not in its fully conducting state.

A further aspect of the invention is a method of controlling the power from an AC source that is supplied to a load, comprising the steps of: closing a switch element in series circuit relationship with the source and the load; opening the switch element after a first predetermined period of time and activating a main energy divertor to divert energy to the load; activating a variable energy divertor after a second predetermined period of time to divert additional energy to the load; stopping the diverting of energy by the main energy divertor and the variable energy divertor by closing the switch element; and repeating the preceding three steps at least once for each half-cycle at the AC source voltage.

According to another feature of the invention, a power control system is connected between a source of power providing an AC input voltage and a load for receiving an AC output voltage, comprising a controllably conductive device in series circuit relationship with at least one impedance; said impedance being insertable between said source of power and said load, during at least one insertion period in each half-cycle of said AC input voltage, said insertion period having a selected phase relationship with said input AC voltage, said insertion period being controlled by controlling the conduction of said controllably conductive device; the duration of the insertion period and the phase relationship of the beginning of the insertion period to said AC input voltage being variable to allow the power delivered from said source of power to said load to be altered; and the maximum current flowing through said controllably conductive device, after the beginning of the insertion period, being controlled to limit the rate of change of AC output voltage to keep said rate of change below a predetermined value.

In an additional aspect of the invention, a power control system for supplying at an output terminal an output load voltage having a predetermined waveform, comprises: a main divertor connected at least to said output terminal; a control circuit; and a variable divertor connected to said input and output terminals, said variable divertor including a controllably conductive device which is controlled by said control circuit to have at least three modes of operation, said modes including (1) an off mode such that said output load voltage is supplied to said output terminal substantially only by said main divertor, (2) an on mode such that said output load voltage is substantially the same as said input line voltage, and (3) a current source mode wherein the conductance of said controllably conductive device is controlled so as to obtain a transition of said output load voltage between said off mode and said on mode.

BRIEF DESCRIPTION OF THE DRAWINGS

The above, and other objects, features and advantages of the invention, will be seen more clearly from the following detailed description of preferred embodiments of the invention, with reference to the accompanying drawings, in which:

FIG. 1 is a waveform produced by a prior art dimmer circuit of the phase control type;

FIG. 2 is a waveform produced by a prior art dimmer circuit of the notch control type;

FIG. 3 is a schematic diagram of a conventional wiring arrangement for illustrating the operation of prior art dimmer circuits;

FIG. 4 is a schematic diagram illustrating a wiring arrangement in which the present invention may be employed;

FIG. 5 is a simplified block diagram for illustrating the basic principles of the invention;

FIG. 8 shows waveforms for illustrating the operation of the preferred embodiment of the invention;

FIG. 9 illustrates the operation of the preferred embodiment when cut-in of the variable divertor occurs too soon;

FIG. 10 illustrates the operation of the preferred embodiment when cut-in of the variable divertor occurs too late;

FIG. 12 is a flow diagram illustrating the operation of the embodiment of FIG. 11;

FIG. 13 is a schematic diagram of a third embodiment of the invention;

FIG. 14 is a simplified block diagram for illustrating the principles of the embodiment of FIG. 13;

FIG. 15 is a schematic diagram of a fourth embodiment of the invention;

FIG. 18 is a block diagram of a power control system according to the preferred embodiment of the invention;

FIGS. 20A and 20B constitute a schematic diagram of the parts of the circuit of FIG. 18 not shown in FIG. 19;

FIG. 21 illustrates a control signal generated by the user control circuit 100 of FIG. 18; and FIG. 22 illustrates a signal at the output of optocoupler 308 of FIG. 20B.

DESCRIPTION OF PREFERRED EMBODIMENTS

Figure 5A:
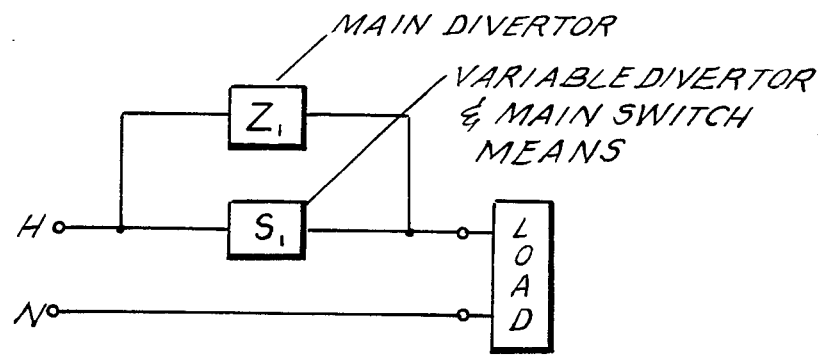
FIG. 5A is a simplified block diagram of a preferred embodiment of the invention.

In the following, the invention will be described as installed in a fluorescent lighting system having conventional non-dimming ballasts. However, this invention may be applied to other gas discharge lighting circuits, including high intensity discharge lighting circuits; incandescent lighting circuits; motors, including fan motors; solid-state ballasts; any capacitive input circuit; and other circuit types which may occur to one of ordinary skill in the art. In the following, the term "load" is broadly intended to include any of these. In connection with the conventional fluorescent system, the term "load" refers to the ballast/lamp combination. The invention also relates to a power control system broadly defined as comprising the novel control circuit together with a load.

A power control system according to the invention includes a main energy divertor and a variable energy divertor, which are inserted into the circuit in series or parallel with the load according to a predetermined sequence of events, resulting in a significantly improved waveform being delivered to the load, with superior dimming performance being attained.

Both the main and the variable energy divertors allow energy stored in the load to be recirculated during periods when the load is not connected to the power source by a low impedance path. The variable energy divertor may further serve to discharge some of the energy stored in the main energy divertor and supply it to the load. For a fuller discussion of energy divertors, including parallel divertors see U.S. Pat. No. 4,350,935 (referenced above); column 12, line 39 to column 13, line 35. The problems noted in column 13, lines 22–27 that are said to generally arise when using series connected divertors are solved by the present invention, which includes a variable divertor.

The "insertion" of a divertor refers to the connection during a particular time period (the insertion period) of either the main energy divertor or the variable energy divertor, or both, so as to have an effect on the load operation; however, outside the insertion period such divertor is cut off and has no effect. Insertion of the variable energy divertor adds a specific modification to the load voltage waveform at the appropriate time to optimize dimming performance, but does not modify the portion of the load voltage waveform outside the insertion period.

For an inductive load the waveform produced by the invention is as follows. At a predetermined point in each half-cycle, (that is, the positive half-cycle or the negative half-cycle in the load waveform) the load voltage is forced to a level having approximately the same magnitude as before the forcing occurs, but opposite polarity. This waveform modification, referred to as the "notch," causes a drop in lamp current, which reduces light output; thus it is the principal dimming mechanism. The waveform is forced to this opposite polarity condition by the insertion of the main energy divertor. The load voltage remains in the opposite polarity condition for a predetermined period of time, which will be referred to as the "notch" period, the duration of which determines the dimming level.

The waveform remains in this state until the end of the notch period, at which time the variable divertor circuit is inserted. The variable divertor circuit then causes the load voltage to return to a level which once again corresponds to the line voltage. The variable divertor changes the load voltage at a rate of change that is slow enough so that no audible noise or EMI is produced, but fast enough to control the position of the notch so as not to appreciably deionize the lamp. The insertion of the main and variable divertors is controlled by a control circuit so as to obtain the desired notch beginning and ending.

Figure 6:
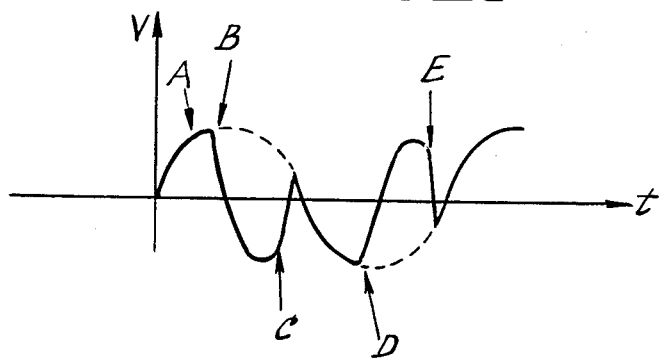
FIG. 6 illustrates a waveform produced by the preferred embodiment.

FIG. 5 is a simplified block diagram for illustrating the basic principles of the invention, and FIG. 6 shows a waveform generated by the circuit of FIG. 5, when adjusted for minimum light output.

In the circuit of FIG. 5, the main divertor $Z_1$ is preferably a capacitor C, and the variable divertor $Z_2$ is preferably a variable current limiting element, although it could also be a fixed element whose time of insertion is varied. Main switch $S_1$ may be, for example, a single power transistor connected within a diode bridge (see FIG. 11). When $S_1$ is closed, the load sees line voltage. This occurs in the portion of the waveform designated A in FIG. 6.

When $S_1$ is opened, at point B, and $Z_2$ is at a high impedance level, the current drawn by the load causes the voltage on the capacitor C to ring in such a way that it is subtracted from the line voltage, which results in a large voltage notch of opposite polarity following point B. The rate at which the capacitor voltage rings, and the peak which it reaches, depends on the capacitance, the point in the cycle where the notch begins, and the size of the load.

Then, at point C in FIG. 6, $Z_2$ is brought from a high impedance level to a lower impedance level. This discharges capacitor C. The capacitor discharges in a controlled manner, since the current is limited by the impedance $Z_2$. As seen in FIG. 6, at point C, the load waveform begins a gradual voltage change until it again reaches line voltage. In FIG. 6, the dashed lines indicate the line voltage during those portions of the cycle at which the load voltage does not equal line voltage. The beginning and ending points of the notch are determined by a control circuit, which will be described below, the notch beginning and ending being varied to determine the light output of the lamp.

When the variable divertor $Z_2$ is inserted at point C to end the notch, the capacitor voltage is substantially linearly discharged so that load voltage value returns to line voltage value, at which time $S_1$ is closed again. This may be referred to at times herein as "cut-in." Note that although some power is dissipated during this transition, it is relatively small because the transition takes a relatively short time. Thus high efficiency is maintained.

The effect of this waveform illustrated in FIG. 6 is to minimize the time the load voltage spends in a low-voltage condition as this will insure that substantial arc current flows for most of the time. The lamp and load voltages should preferably be close to a square wave. If too much time is spent in a low-voltage condition, the lamp will deionize to the extent that when load voltage does return, the subsequent restriking voltage required by the lamp will be too high and the ballast will no longer be able to supply it. The lamp will drop out or will jump to a much lower light level.

Minimizing the lamp deionization time is also important for balancing, because if the time is too long the lamp, even if it does not drop out, may drop to a much lower intensity, as the ballast/lamp combination drops to a different operating point. This new operating point will depend on second-order effects involving the saturation characteristics of the ballast. Thus, such new operating point will be different for each ballast/lamp combination. Additionally, these second-order effects account for the main differences between ballasts from different manufacturers. However, since the load voltage waveform of the invention keeps lamp deionization time at a minimum, the problem is substantially avoided and balancing is improved.

The current limiting impedance $Z_2$ may be referred to herein at times as a current source, for the following reasons. For each point in time there is a relationship between V and I, that is, $$\frac{V \text{(instantaneous)}}{I \text{(instantaneous)}} = Z$$

Thus, $Z_2$ behaves as an impedance. However, in the embodiments to be described below $Z_2$ may not be a typical impedance element but rather may be a current source circuit which uses feedback, such that the gain automatically changes with V, so as to keep I constant when V changes. Thus, $$I = \text{Constant} = \frac{V(t)}{Z(t)}.$$

Essentially what happens is that the feedback varies $Z(t)$ as $V(t)$ varies in order to keep I constant. This feature may advantageously be employed to simplify the power control circuitry and reduce the component count.

For example, FIG. 5A illustrates a preferred embodiment of the invention, in which the main divertor $Z_1$ is preferably a capacitor C and the variable divertor comprises main switch means $S_1$, which is a controllably conductive device. Referring once again to FIG. 6, during the portion of the waveform designated A, switch $S_1$ is closed, and once again at point B, $S_1$ is opened and the voltage on capacitor C rings such that it is subtracted from the line voltage.

At point C in FIG. 6, $S_1$ is put into a mode where its conductivity is controlled according to a sensed circuit parameter such as load voltage, input voltage, output current, or another appropriate parameter. This discharges the capacitor C in a controlled manner. If the conductivity of $S_1$ is controlled such that a constant current passes through it, then capacitor C is discharged linearly. This linear discharge is continued until the load voltage equals the line voltage at which time $S_1$ is closed, i.e. forced to a high conductivity state.

Figure 7:
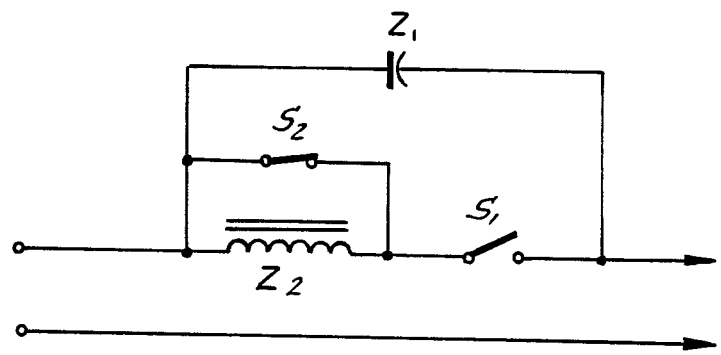
FIG. 7 is a schematic diagram illustrating a second embodiment of the invention.

Other types of current source may be used. For example, FIG. 7 is a simplified diagram of a second embodiment of the present invention, which is not preferred because it is more expensive. In the circuit of FIG. 7, a choke in parallel with a second switch $S_2$ is the variable divertor and is used as a switchable current source to provide the same desired waveform as the preferred embodiment.

This embodiment has two impedance states. In the first, $S_1$ is open, and $S_2$ is closed. In the second impedance state, $S_1$ is closed, and $S_2$ is open. In FIG. 7, the first impedance state is shown, with $S_2$ closed. This state occurs from point B to point C in FIG. 6.

At point C in FIG. 6, the circuit is switched to the second impedance state. In this case $Z_1$ is linearly discharged by virtue of the choke, which will behave as a current source much like the preferred embodiment. The choke acts like a current source because its impedance is large compared to the impedance of the capacitor $Z_1$. When $S_2$ opens and $S_1$ closes, the energy stored in $Z_1$ is transferred to $Z_2$, thus resulting in the load voltage returning to the line voltage.

This embodiment is capable of providing a waveform with relatively short zero current regions even while reducing arc current below 10%. This results in relatively little deionization of the lamp during each half-cycle, and thus the lamp does not require a large restriking voltage in each ensuing half-cycle. Poor dimming occurs when the lamp is deionized to the point where a high lamp voltage has to be provided to produce lamp current after a long zero-current region. As stated above, this may result in a bump in the dimming curve, poor lamp-to-lamp balancing, or one or more lamps dropping out.

FIGS. 8-10 show waveforms for illustrating the operation of the invention.

FIG. 8 illustrates desirable curves of (a) load voltage, (b) ballast current, (c) lamp voltage and (d) lamp current for obtaining dimming down to 10% of full range, with good lamp-to-lamp balancing and stable, flicker-free operation.

Some appropriate criteria are as follows. In FIG. 8(a), the time spent by the load voltage curve near zero, i.e., near the point designated A, should be minimized. If the load voltage remains at a relatively low magnitude for too long, the lamp current, which lags the load voltage, may go to zero before the lamp voltage rises again. The relationship of load (and lamp) voltage and lamp current is illustrated in FIG. 8(d). In the part of the curve of FIG. 8(d) designated B, the magnitude of the lamp current is beginning to decrease, and does not increase again until the region designated C, where the load and lamp voltage magnitudes again rise.

Referring again to FIG. 8(a), the slope of the voltage notch, in other words the portion of the curve designated D, should not be too steep. If it is too steep, lamp current may be stopped too soon. The peak of the notch voltage, namely the portion of the curve designated E, must be high enough to overcome the ionization potential, and cause lamp current reversal.

Note in FIGS. 8(a) and 8(c) that the load voltage is very similar to the lamp voltage, and both are approximately square waves. This means that there is very little net voltage drop across the ballast, and the load input voltage directly determines the lamp current. Each half-wave of the lamp voltage curve is seen to have two peaks, a front peak F and back peak G. Note also FIG. 8(d), which illustrates that a relatively short period of near-zero lamp current occurs in the desirable curves produced by the invention, which maintains the ionization of the lamp.

These advantageous features, including the relatively large notch voltage, are facilitated by the manner in which the variable divertor circuit is controlled. The capacitance value C can be made large enough to keep the notch voltage high for a relatively long period of time, without resulting in an excessively long discharge time, because the cut-in of the variable divertor circuit discharges the capacitor relatively rapidly. FIGS. 9 and 10 illustrate the importance of the cut-in position, and thus illustrate the importance of the insertion point of the variable divertor circuit.

FIG. 9 illustrates the case in which the cut-in of the variable divertor occurs too soon, and thus the notch voltage E' does not reach a high enough peak. In this case, there is a long period of near-zero lamp current, designated H in FIG. 9(d). Thus, the lamp will require a large restrike voltage, and the front peak F' will be too low. This leads to the problems of instability and imbalance at low light levels referred to previously, since restriking must take place in this situation at the back peak G' of the lamp voltage curve.

FIG. 10 illustrates the situation when cut-in of the divertor occurs too late. The voltage notch E'' is allowed to decay, which, again, allows the lamp current to go to near zero for too long a time, as shown at H'. Because the lamp is deionized, the front peak F'' of the lamp voltage curve, although high, will be insufficient to restrike the lamp.

The difference between each ballast current waveform and the respective lamp current waveform in FIGS. 8–10 is due to the current drawn by the lamp filaments and the magnetizing current of the ballast, which contribute to the ballast current waveform but not to the lamp current waveform.

Figure 11:
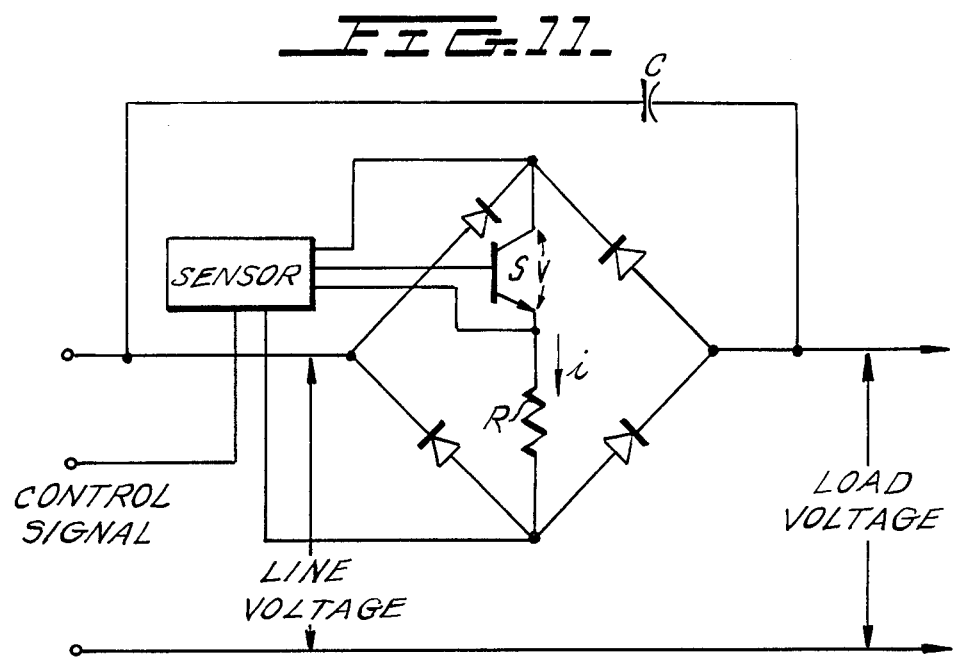
FIG. 11 is a schematic diagram illustrating the basic topology of the preferred embodiment of the invention.

FIG. 11 illustrates the basic circuit topology of the preferred embodiment of the invention, for illustrating the insertion of the main divertor and its relationship with the insertion of the variable divertor. Specifically, it will be explained how the insertion of the variable divertor is controlled for ending the notch.

Referring to FIG. 11, the main divertor in the preferred embodiment is a capacitor C. The variable divertor comprises a series connection of a controllably conductive device S, and a low value resistor R. Although the controllably conductive device S is represented herein as a transistor, it may alternatively be any other controllably conductive device capable of operating in class A mode, such as an FET, IGT, etc.

Referring to FIG. 12 the power control circuit has three operating modes, rather than two modes as in prior art phase control and notch control devices (FIGS. 1 and 2). During the notch, i.e., during the period when load voltage is to be determined by the voltage across capacitor C, the controllably conductive device S is off. However, after an appropriate control signal has been generated to end the notch (as discussed below), controllably conductive device S may either be fully on or partially on, depending on the state of a base control signal to the controllably conductive device S and on the sensed voltage v and current i across the controllably conductive device S, which are sensed by a sensor (see FIG. 11).

After the notch ending signal, four states are possible:

(1) If $v \leq V_o$ (where $V_o$ is a threshold, such as 80 V in a 120 V unit): S can be either on or off according to the base control signal.

(2) $v > V_o$: S is off regardless of the base control signal.

(3) $v \leq V_o$ and $i_{sc}$ (short circuit) $\geq I_o$ (where $I_o$ is a threshold such as 10A in a 120 V unit): When the control circuit gives the "on" signal, the circuit goes into a current source mode, wherein S is controlled so as to set $i = I_o$. In equation (3), $i_{sc}$ refers to the current that would flow if the variable divertor were short-circuited.

The first state of the controllably conductive device S is provided for reliable operation of the transistors available—it limits the maximum energy applied to the transistor. Also, this limits the additional power dissipated in the transistor due to discharging the capacitor which equals $\frac{1}{2} CV_o^2 f$ (wherein f=120 Hz for a line frequency of 60 Hz). The second state may occur, for example, when several lamps are out, because in such a case the ballasts have more stored energy and thus the capacitor voltage rings higher. When the third state is reached, the capacitor is discharged by the current supplied thereto and notch ending is completed.

(4) If $v \leq 10$ V and $i_{sc} \leq I_o$ (before notch ending signal): Controllably conductive device S goes on. This fourth state stabilizes the circuit near full intensity but is not used when dimming. It is not a necessary part of the process for obtaining good dimming, so it is not included in the flow chart of FIG. 12, which illustrates the basic operational sequence just described.

In addition to dimming down to 10%, this embodiment of the invention achieves the other objects mentioned above. For example, the invention provides slow transitions in load voltage, leading to acoustically quiet operation.

RFI production also is quite low because all transitions of current and voltages are slow. Thus there are no high frequency harmonics that would cause interference.

Also, the power control system of this invention can drive loads having capacitive inputs for the same reason, namely that dv/dt is always very low. Thus, a programmed variable divertor according to the invention can be set up to provide significantly better dimming performance. As further discussed below, means are provided for paralleling of units without splitting up loads, including a current limit circuit which ensures that no one unit takes more than its share of current.

The preceding embodiment is preferred since it uses only one main power transistor to perform both the switch function and the current limiting function. Thus, it is the simplest and most cost-effective embodiment for commercial use, at least for rapid-start fluorescent lamps.

FIGS. 13–17 illustrate additional embodiments of the invention and the waveforms that they generate. The embodiment of FIG. 13 is advantageous in that it can be used to insert more than one notch per half-cycle, while still maintaining slow transitions. With more than one notch, the variable divertor can additionally be programmed to hold a maximum ripple current in load current by closing the notch when $\Delta i$ reaches a certain value. This provides superior dimming control for the type of lower impedance lamps commonly referred to as "energy-saving" lamps. It is also useful for some motors, particularly smaller motors, as it would produce less "cogging."

Figure 13A:
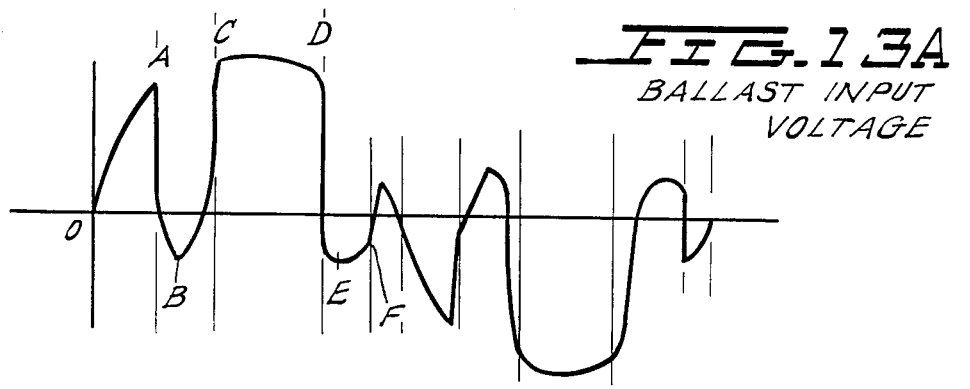
FIGS. 13A and 13B, respectively, show ballast input voltage and ballast input current waveforms produced by the circuit of FIG. 13.
Figure 13B:
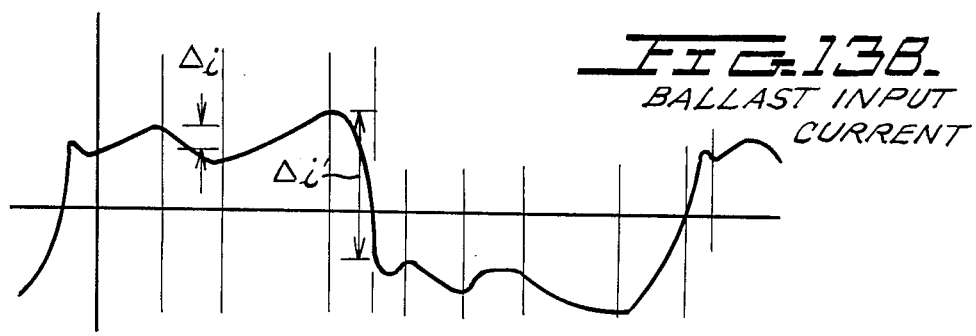

FIG. 13A shows a typical ballast input voltage waveform and FIG. 13B shows a typical ballast input current waveform produced by the circuit of FIG. 13. The operation of the circuit of FIG. 13 is described with reference to the points labeled 0, A, B, C, D, E and F in FIG. 13A. Initially, controllably conductive device S1 is conducting. At point A in the first half-cycle, a predetermined time after point 0, which is the zero-crossing of the AC supply, controllably conductive device S1 is made non-conducting. Sometime later, at point B, SCR1 is gated on, and the voltage on capacitor C1B is reversed as it rings with inductor L1. At point C, SCR1 commutates off since the current flowing through it has returned to zero. At this time the voltage across C1B is approximately equal in value to the voltage across it at point B, but of opposite polarity.

The value of capacitor C1A equals the value of capacitor C1B. Hence, up to point B the voltage across capacitor C1A equals the voltage across C1B. The voltage across C1A remains essentially constant from point B to point C. Thus, it can be seen that at point C the voltage across capacitor C1B is equal, and of opposite polarity, to that across C1A. Hence, the voltage between hot input terminal 901 and load output terminal 902 at point C is essentially zero, and at point C controllably conductive device S1 is made conducting again. The positioning of point B is determined by the current sense circuit, which gates on SCR1 after the ballast input current has decreased by a first predetermined value $\Delta i$.

At point D, which is a second predetermined time after point 0, controllably conductive device S1 is made non-conducting and then SCR2 is gated on. This results in the voltage across C1B reversing again and the load voltage going to point E. At point E SCR2 commutates off, and the load current (ballast input current), slowly reverses in the same manner as in the preferred embodiment (FIGS. 11–12). A notch ending procedure, similar to that described in connection with FIGS. 11 and 12, is initiated at point F, when a second predetermined change in ballast input current $\Delta i'$ has occurred (see FIG. 13B) as sensed by the current sensing circuit. In the negative half-cycle the sequence of events is similar except that SCR2 is gated on during the first notch and SCR1 is gated on immediately after the start of the second notch.

The circuit of FIG. 13 and the control process it represents gives a more precise control of load current waveshape than in prior systems and produces a load current waveform that is very close to a square wave. As noted earlier, this is desirable to enable good dimming performance. In the case of energy-saving fluorescent lamps and some high intensity discharge lamps, this more precise control over load current waveform is necessary to achieve a low minimum dimming level (e.g., 10% light level for energy-saving fluorescent lamps).

A problem that arises when dimming fluorescent lamps are operated with rapid-start ballasts is ensuring that the ballast input current decreases monotonically as the light level is reduced. This is important to ensure that the circuit breakers and wiring do not become overloaded and also that the ballasts do not run at a higher than normal temperature, hence reducing their life or decreasing their reliability. With standard fluorescent lamps the desired monotonic reduction in ballast input current is achieved by using the circuit of the preferred embodiment. However, to achieve this result with energy-saving fluorescent lamps it is preferred to use the circuit of FIG. 13.

It should be noted that the circuit of FIG. 13 produces an output voltage waveform with slow transitions by virtue of the novel ringing procedures for the main divertor capacitor (C1A+C1B), and hence achieves the desired results of low RFI and acoustical noise.

FIG. 14 is a simplified block diagram illustrating the principles of the embodiment of FIG. 13, discussed above.

In the embodiment of FIG. 15, controllably conductive devices S11 and S12 are driven by a square wave signal which is phase-delayed with respect to the AC supply voltage. The drive signal for S11 is the inverse of the drive signal for S12. The inductances L11 and L12 are selected to be significantly greater in value than the equivalent inductance of the ballast load. This ensures that the output current waveform is determined by the effects of L11 and L12 and not by the particular ballast load. For example, a ballast for a 400 W high intensity discharge lamp operated from a 120 V 60 Hz line would have an equivalent series inductance of about 30 mH. Hence L11 and L12 might be chosen to have a value of 100 mH each. Whatever value is chosen, it is important the L11 and L12 have the same value and that their windings have the same number of turns.

Figure 15A:
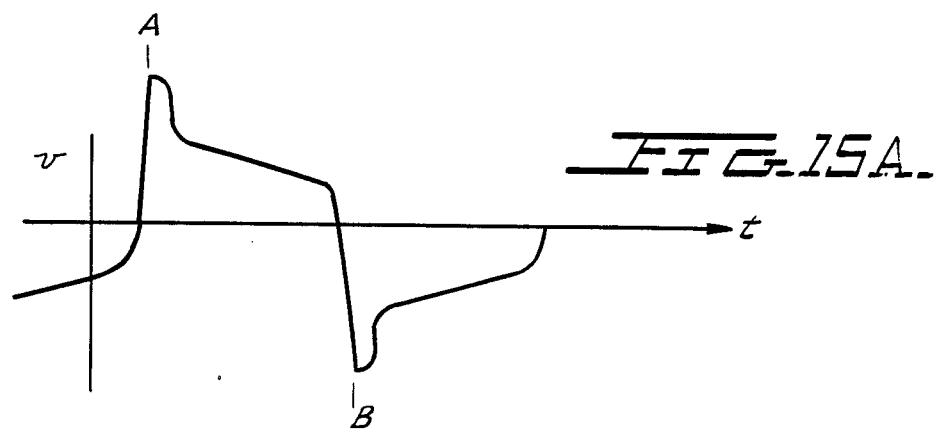
FIGS. 15A and 15B, respectively, show ballast input voltage and ballast input current waveforms produced by the embodiment of FIG. 15.
Figure 15B:
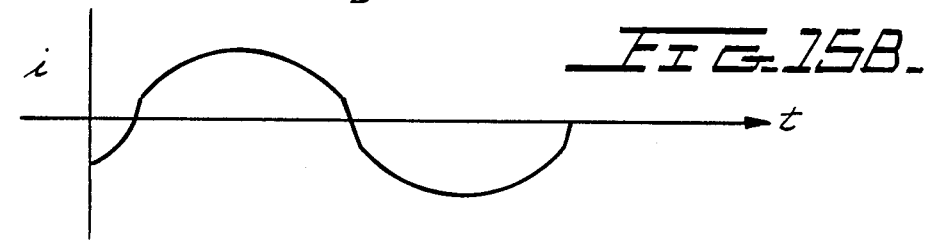

FIGS. 15A and 15B show typical curves of ballast input voltage and ballast input current, respectively, for the embodiment of FIG. 15. Prior to point A in FIG. 15A, S12 is conducting and the load current is negative and flowing through inductor L12. At point A the square wave drive to controllably conductive devices S11 and S12 is reversed such that S11 is turned on and S12 is turned off, and the current that was flowing in L12 is forced to flow through L11. This forces the ballast input current positive. The stored energy in the core of L12 forces the current in L11 to have the same magnitude as the current which was flowing in L12 and hence a nearly square output current waveform is produced.

Capacitor C11 diverts the energy stored in the ballast of the load so that all voltage transitions are smoothed. At point B, S12 is turned on and S11 is turned off.

Dimming is obtained by increasing the phase angle $\theta$ of the drive signal to controllably conductive devices S11 and S12, with respect to the AC source voltage. As $\theta$ increases, less and less power can be delivered from the AC line, since Power=(voltage)×(current)×(Cos $\theta$). In practice the current is also reduced as the phase angle $\theta$ is increased, since the impedance of the lamps increases as the power is reduced. Changing the phase angle $\theta$ effectively varies the amount of energy diverted by the variable divertor of this embodiment.

The topology of FIG. 15 is particularly useful with high intensity discharge lamp loads. This is because the stored energy in the transformer formed by L11 and L12 gives a high-voltage pulse during current reversal which keeps the lamp current flowing, without significant off-time, and thus prevents the deionization of the lamp. Since high intensity discharge lamps have a short deionization time this effect of minimization of off-time is particularly useful. In this embodiment of the invention, the programming of the programmed variable divertor formed by L11 and L12 is done by varying the phase relationship of the controllably conductive device drive signals.

Figure 16:
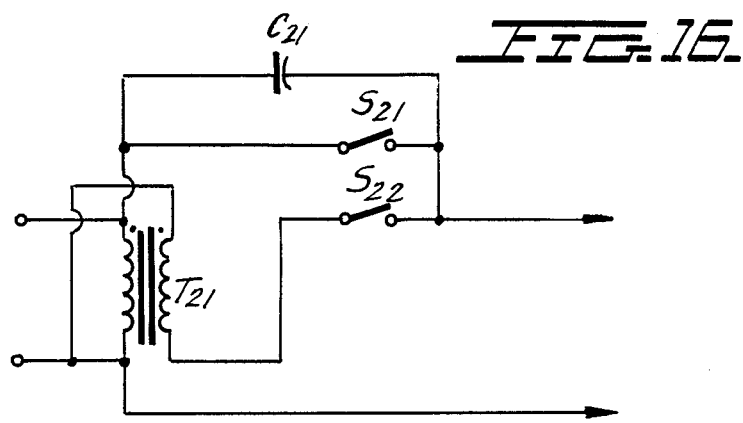
FIG. 16 is a schematic diagram showing a fifth embodiment of the invention.
Figure 17:
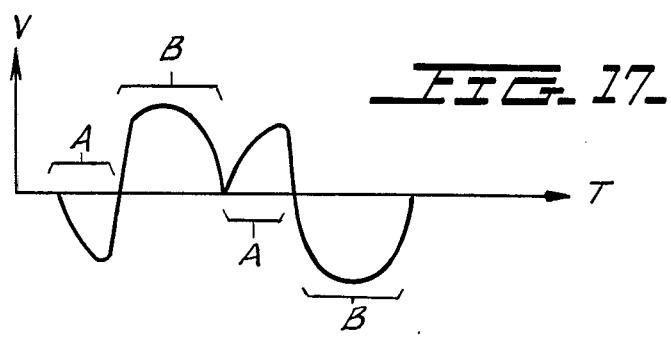
FIG. 17 illustrates a load output voltage waveform produced by the embodiment of FIG. 16.

A further embodiment is seen in FIG. 16. The load output voltage waveform for this embodiment is illustrated in FIG. 17. The portion of the curve designated A in FIG. 17 is the period during which controllably conductive device S22 is conducting. The portion of the curve designated B is similarly the period when controllably conductive device S21 is conducting. The operation of this embodiment is very similar to the operation of the embodiment of FIG. 15 described above, except that here line voltage is reversed instead of load current. Transformer T21 may be made smaller, and will hence be less expensive, as compared to the transformer formed by L11 and L12 in FIG. 15, since it is not necessary to store any energy in T21, which is required in the embodiment of FIG. 15.

A disadvantage of this embodiment is that it may not be suitable for the "sensitive" high intensity discharge lamps mentioned above, since no high voltage pulse is produced. As before, capacitor C21 smooths the voltage transitions.

Figure 19:
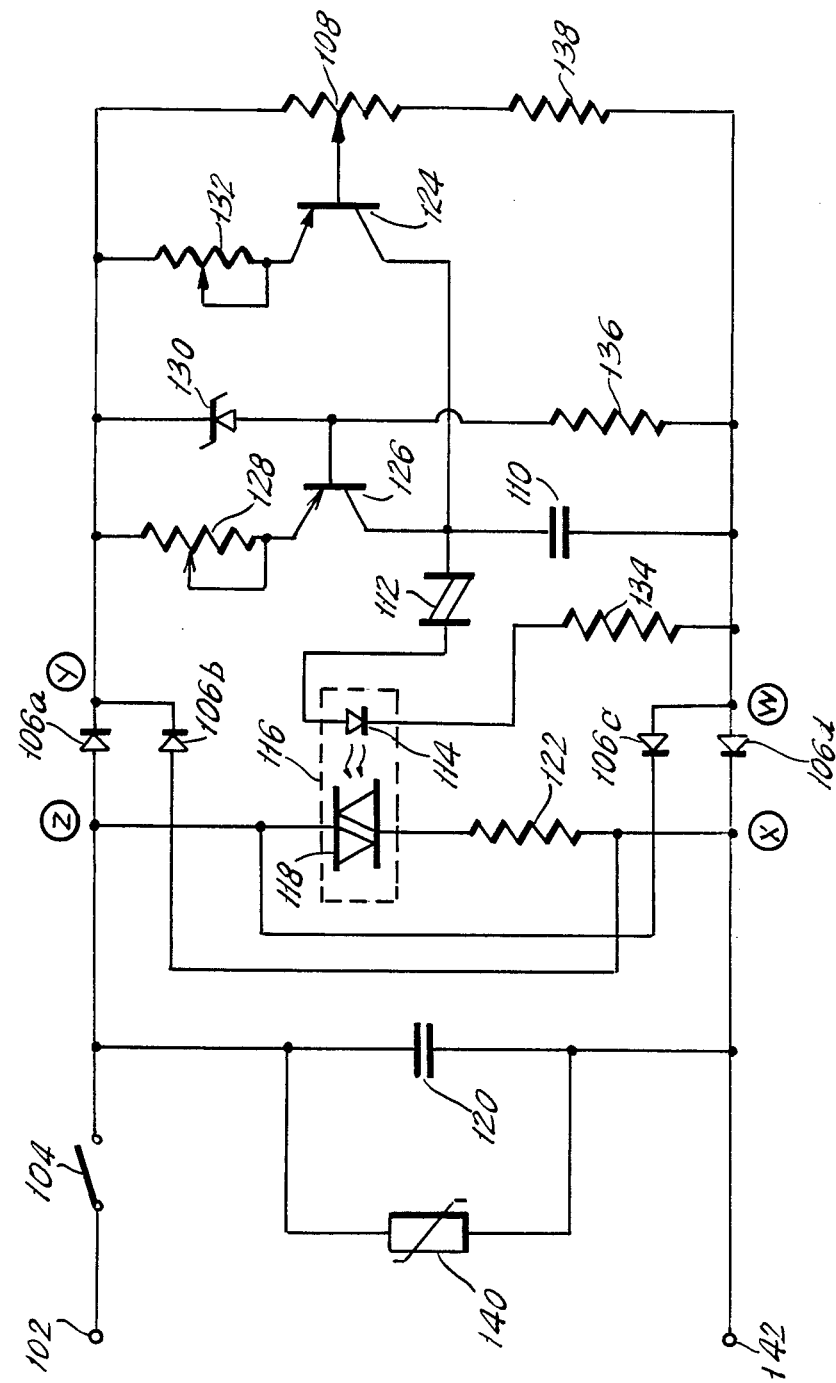
FIG. 19 is a schematic diagram of the user control circuit 100 of FIG. 18.
Figure 20B:
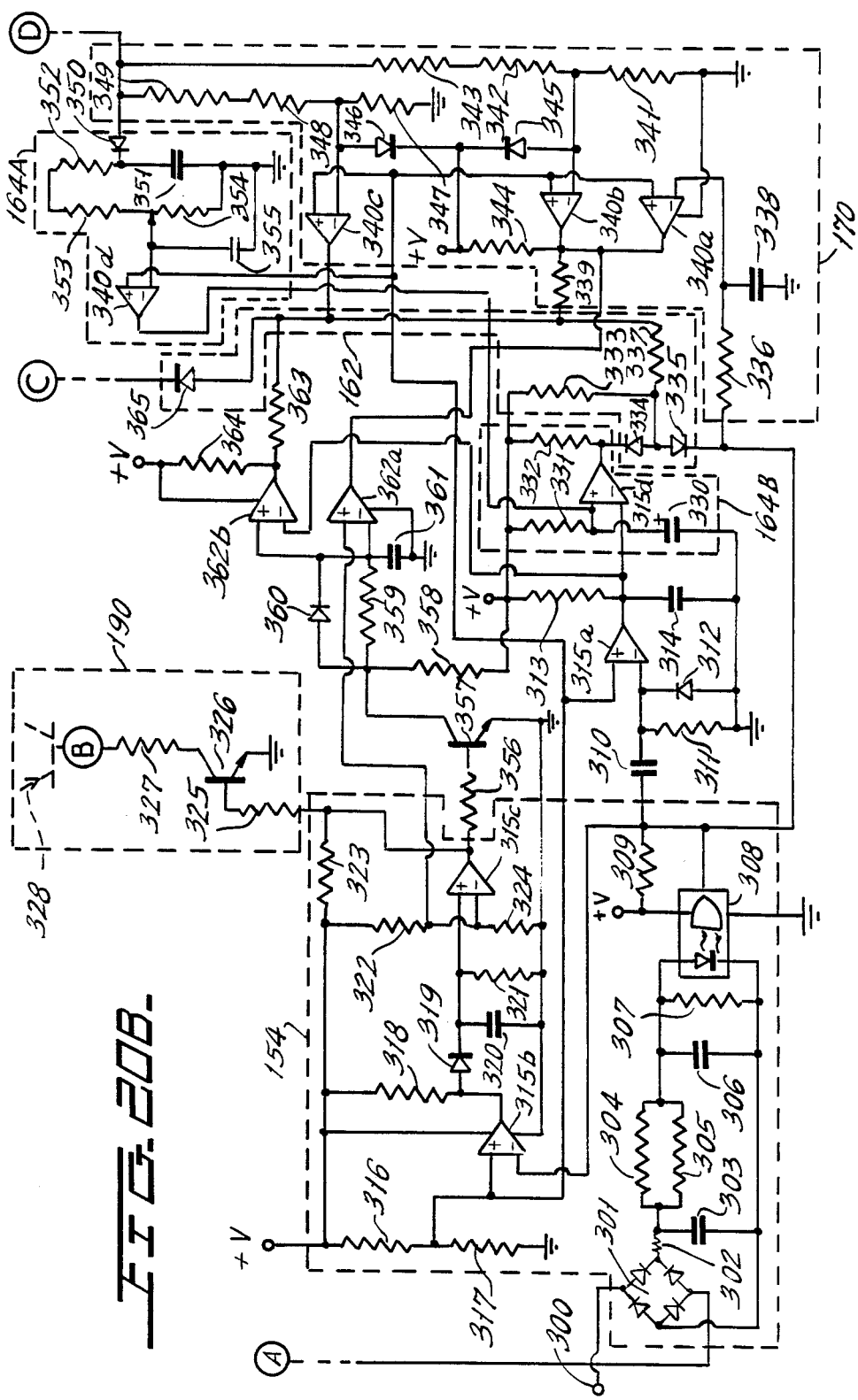

FIG. 18 is a block diagram of a power control system according to the above-discussed preferred embodiment of the invention. FIG. 19 is a schematic diagram of the wall box control circuit 100 of FIG. 18. FIGS. 20A and 20B are together a schematic diagram of the power controller which comprises the remainder of FIG. 18.

Referring to FIG. 18, a control signal is generated by a two-wire phase control circuit 100 which may advantageously be wall-mounted for control by the user. This control signal is received by a phase control interface 154. Output signals from phase control interface 154 are applied to a relay activation circuit 190, and to a notch position circuit 162, which is part of a variable divertor circuit 156. Relay activation circuit 190 controls the operation of a main power relay 180 which serves as an airgap on/off switch for the power control system. Hence it is possible to turn the main power relay 180 on or off simply by manipulating the user adjustment means 100a in two-wire phase control circuit 100.

Notch position circuit 162 controls base drive circuit 230, which in turn controls the operation of main transistor switch 158. Notch position circuit 162 also receives inputs from transistor voltage sensing circuit 170 and fault protection circuit 164. Current limit circuit 220 senses the current flowing in main transistor switch 158 and produces a control signal for base drive circuit 230.

Main transistor switch 158, notch position circuit 162, fault protection circuit 164, transistor voltage sensing circuit 170, current limit circuit 220 and base drive circuit 230 together form variable divertor 156.

The operation of variable divertor 156 is described in the flow chart of FIG. 12. In response to a control signal from two-wire phase control circuit 100, phase control interface circuit 154 applies a turn-off signal to notch position circuit 162. This occurs X degrees after the zero crossing of the AC line voltage, and causes notch position circuit 162 to signal base drive circuit 230 to remove base drive from main transistor switch 158, which turns transistor switch 158 off. Y degrees after the removal of base drive from main transistor switch 158, phase control interface circuit 154 applies a turn-on signal to notch position circuit 162, which begins the turn-on process for main transistor switch 158.

On receipt of the turn-on signal, notch position circuit 162 senses the input from transistor voltage sensing circuit 170. If the voltage across main transistor switch 158 is above a certain predetermined value, no signal is sent to base drive circuit 230. However, once the input to notch position circuit 162 from transistor voltage sensing circuit 170 indicates that the voltage across main transistor switch 158 has fallen below the predetermined value, then a signal is sent to base drive circuit 203 from notch position circuit 162, causing base drive circuit 230 to apply base drive to main transistor switch 158.

On receipt of this signal, base drive circuit 230 senses the output from current limit circuit 220. If the current that would flow if main transistor switch 158 were fully conducting (referred to above as $i_{sc}$) is less than a certain predetermined value, the current limit circuit 220 signals base drive circuit 230 to turn main transistor switch 158 fully on. If the current that would flow if main transistor switch 158 were fully conducting is greater than the predetermined value, then the current limit circuit 220 controls base drive circuit 230 to maintain the current through main transistor switch 158 at the predetermined value.

Fault protection circuit 164 responds to any extreme voltages sensed across main transistor switch 158 by transistor voltage sensing circuit 170. These voltages can arise when a significant portion of the lamp load becomes non-conducting, due to lamps being removed from the circuit or at the end of lamp life, for example. When such a condition is detected by fault protection circuit 164, it signals notch position circuit 162 to turn main transistor switch 158 off. After a short period of waiting, the turn-on process is begun again. The fault protection circuit 164 will trip again and turn main transistor switch 158 off again if the fault still exists. The unit will cycle between these two modes until the fault condition is corrected.

Capacitor 200 is the main divertor of the preferred embodiment of the invention. MOV (metaloxide varistor) 202 protects main transistor switch 158 from high-energy voltage transients. Transformer 150 supplies power to base drive power supply 152 and low-voltage power supply 160. Base drive power supply 152 provides power to base drive circuit 230. Low-voltage power supply 160 provides power to the remainder of the control circuits.

FIG. 19 is a schematic diagram of the user control circuit 100. Line hot terminal 102 feeds switch 104. Switch 104 may be advantageously coupled to the operating member (shaft) of potentiometer 108, which serves as the user adjustment means 100a for the apparatus, such that switch 104 is opened when the operating member of the potentiometer 108 is adjusted to be at one extreme of its travel.

The line voltage across points Z and X is rectified by a full-wave bridge rectifier 106 comprising diodes 106a, 106b, 106c and 106d. The full-wave rectified output appears across points Y and W and serves as a power supply for transistors 124 and 126. The combined current supplied through transistors 124 and 126 serves to charge capacitor 110. The combination of adjustable resistor 128, transistor 126, Zener diode 130 and resistor 136 provides a voltage-regulated current source. The power output from the overall power control system of the embodiment, with the user adjustment means set at its maximum setting, can be set by adjusting the setting of adjustable resistor 128.

The combination of potentiometer 108, adjustable resistor 132, transistor 124 and resistor 138 provides an adjustable current source. The power output from the power control system is adjusted by varying the setting of potentiometer 108, which varies the amount of current sourced by transistor 124. The exact component values can be chosen to provide any desired relationship between the setting of potentiometer 108 and the power output from the power-control system. Adjustable resistor 132 is used to set the power output from the power control system with the user adjustment means at its minimum setting and hence provides a low-end setting adjustment.

By varying the amount of current supplied to capacitor 110 as described above, the time taken for capacitor 110 to charge up to the breakover voltage of silicon bilateral switch (SBS) 112 is varied. The presently preferred value of the breakover voltage is about 8 volts. When the voltage across SBS 112 is below 8 volts, SBS 112 has a very high impedance. However, when the voltage across SBS 112 is above 8 volts, SBS 112 begins to conduct and discharges capacitor 110 through gate LED 114 of optically coupled switch 116, and load resistor 134. Gate LED 114 emits light as a result of the current flowing through it. This light is received by light-sensitive triac 118, which turns on and shorts bridge rectifier 106 across points X and Z. When triac 118 turns on, line voltage is supplied directly through resistive load 122 to control output terminal 142.

Accordingly, the user control of FIG. 19 delivers a control signal comprising the line voltage with a leading portion of each half cycle being forced to zero when triac 118 is not conducting. The control signal thus generated is illustrated in FIG. 21. The length of time, t', during which triac 118 does not conduct is varied by changing the setting of potentiometer 108.

Transient voltages on the line voltage are prevented from reaching triac 118 by capacitor 120. Metal-oxide varistor (MOV) 140 protects the user control circuit of FIG. 19 from extreme impulses on the line due to lightning strikes, photocopying machines, etc.

The user control circuit of FIG. 19 provides voltage compensation as follows: As the line voltage increases, the portion of the cycle during which triac 118 conducts increases, since the voltage across points Y and W is greater and the capacitor charging current sourced by transistor 124 is higher, which causes the threshold voltage of SBS 112 to be reached in less time in each cycle. As the line voltage decreases, the triac conduction time decreases. The control signal illustrated in FIG. 21 is further processed as described below to produce the signal illustrated in FIG. 22. During portions of the signal of FIG. 21 where the triac 118 is in conduction, the signal of FIG. 22 is zero. The portions of the signal of FIG. 22 wherein the signal is zero correspond to the notch portions of the output load voltage (see description below). Thus increasing line voltage results in a widening of the notch period of the load output voltage, which tends to maintain a constant light output. Similarly, decreasing line voltage narrows the notch period and corrects for the low line voltage.

The presently preferred values of the resistors and capacitors of the circuit of FIG. 19 are given in Table 1 below. All resistors are 0.5 W power rating.

TABLE 1

| Resistor | Value in Ohms | Capacitor | Value | Voltage Rating |
|---|---|---|---|---|
| 108 | 300k (variable) | 110 | 0.2 μf | 400 V |
| 128 | 100k (adjustable) | 120 | 0.047 μf | 400 V |
| 132 | 220k (adjustable) | | | |
| 134 | 100 | | | |
| 136 | 560k | | | |
| 138 | 560k | | | |

Bridge 106 consists of diodes 106a, 106b, 106c and 106d, which have ratings of 1 Amp, 600 V. Silicon bilateral switch 112 has a breakover voltage between 7 and 9 volts. Optically coupled switch 116 is a Motorola MOC 3020. Transistors 128 and 132 are Motorola MPS A92. Zener diode 130 has a Zener voltage of 8.5 V. PTC 122 has a nominal value of 330 ohms. Metal-oxide varistor 140 is a Panasonic 20K221U.

FIGS. 20A and 20B are the schematic diagram corresponding to the block diagram of FIG. 18 exclusive of the user control circuit 100. The control signal generated by user control circuit 100 and illustrated in FIG. 21 is applied to phase control signal input 300. The signal from input 300 is applied to point A in phase control interface circuit 154 (FIG. 20B).

The first stage of phase control interface circuit 154 comprises full-wave bridge 301, resistors 302, 304, 305, 307 and 309, capacitors 303 and 306 and optocoupler 308. The phase control signal at input 300 is rectified by full-wave bridge 301 and then filtered by the two-stage low-pass filter comprising resistor 302 and capacitor 303; and resistors 304 and 305 and capacitor 306. The rectified filtered signal is applied across load resistor 307 and the input to optocoupler 308. Optocoupler 308 serves to electrically isolate the first stage of the phase control interface circuit 154 from the remainder of the power controller circuitry. The signal at the output of optocoupler 308 is illustrated in FIG. 22. Resistor 309 serves as a pull-up resistor for the output of optocoupler 308.

The output from optocoupler 308 is applied to the negative input of operational amplifier 315b. The positive input is supplied with a reference voltage of half the supply voltage, which is provided by the potential divider formed by resistors 316 and 317. Resistor 318 is the output pull-up resistor for operational amplifier 315b. The output from operational amplifier 315b is used to charge capacitor 320 via diode 319, and is connected to the positive input of operational amplifier 315c through diode 319. Resistor 321 serves as a bleeder resistor for capacitor 320. Resistors 322 and 324 form a potential divider which supplies a reference input voltage of approximately one-third supply voltage to the negative input of operational amplifier 315c. Resistor 323 serves as a pull-up resistor for the output of operational amplifier 315c. The output of operational amplifier 315c is applied to relay activation circuit 190.

With no control signal present at control signal input 300, the output from optocoupler 308 is pulled high by pull-up resistor 309. Thus, the voltage at the negative input to operational amplifier 315b is greater than the reference voltage at the positive input. Hence, the output from operational amplifier 315b is forced low. Any charge that was on capacitor 320 is discharged by bleeder resistor 321, and thus the input voltage at the positive input to operational amplifier 315c is less than the reference voltage at the negative input. Hence, the output from operational amplifier 315c is forced low. Thus a low signal is applied to relay activation circuit 190.

With any control signal present at control signal input 300, the output from optocoupler 308 will be driven low for some portion of each half cycle. This in turn will drive the output from operational amplifier 315b high for the same portion of each half cycle. This will allow capacitor 320 to charge up to the supply voltage in each half cycle with this voltage being applied to the positive input to operational amplifier 315c. This forces the output of operational amplifier 315c high and a high signal is applied to relay activation circuit 190. Bleeder resistor 321 will not be able to discharge capacitor 320 far enough in each half cycle to lower the capacitor voltage below the reference voltage applied to the negative input of operational amplifier 315c.

Relay activation circuit 190 comprises resistors 325 and 327 and transistors 326 and 328. With a low signal applied to relay activation circuit 190, transistors 326 and 328 are both cut off and no current flows through the coil of main power relay 180. However, when a high signal is applied to relay activation circuit 190 base current flows through resistor 325 and turns transistor 326 on. This in turn causes base current to flow in transistor 328 and resistor 327 causing transistor 328 to turn on. Transistor 328 turning on causes current to flow through the coil of main power relay 180, closing the relay contacts and applying line voltage to main transistor switch 158. Flyback diode 329 allows current to circulate from the coil of main power relay 180 when transistor 328 turns off, protecting transistor 328 from excessive voltage.

Notch position circuit 162 comprises diodes 334, 335 and 365 and resistors 333 and 337. Diodes 334 and 335 together with pull-up resistor 333 form an OR gate. When the outputs of optocoupler 308 and of operational amplifier 315d are high, then pull-up resistor 333 pulls the junction of the anodes of diodes 334 and 335 high. Thus, current flows through base resistor 337 and diode 365 to turn on transistor 366 in base drive circuit 230, which turns main transistor switch 158 on. (See more detailed description of the operation of base drive circuit 230 below.)

If either the output of optocoupler 308 or of operational amplifier 315d goes low, then the junction of the anodes of diodes 334 and 335 is pulled low, and base drive is removed from transistor 366 turning it off. Thus, main transistor switch 158 is turned off.

Operational amplifiers 340a and 340b and their associated components are part of voltage sensing circuit 170. In operation, this circuitry serves to begin the notch closing sequence of main transistor switch 158 prior to the zero-crossing of the AC line if the transistor collector voltage falls below a predetermined value. The function of operational amplifier 340a is to detect the time during each half cycle when the output from optocoupler 308 goes low.

The output signal from optocoupler 308 is passed through a low-pass filter comprising resistor 336 and capacitor 338, which introduces a phase delay of approximately 200 microseconds, and is applied to the negative input of operational amplifier 340a.

The positive input to operational amplifier 340a is connected to a reference voltage of half the supply voltage. When the output from optocoupler 308 is high then the output of operational amplifier 340a is forced low. When the output from optocoupler 308 is low, then the output of the operational amplifier becomes an open collector and the output voltage is determined by external circuit conditions.

The function of operational amplifier 340b is to detect when the voltage across main transistor switch 158 falls below a certain predetermined value.

The collector of main transistor switch 158 is connected though series-connected resistors 343 and 342 to the negative input of operational amplifier 340b. Resistors 343 and 342 together with resistor 341 form a potential divider which is used to apply a portion of the collector voltage of main transistor switch 158 to the negative input of operational amplifier 340b. The positive input of operational amplifier 340b is connected to a reference voltage of half the supply voltage. Hence when main transistor 158 is on and there is no voltage developed across it, the output from operational amplifier 340b is an open collector and is determined by external circuit conditions. When main transistor switch 158 is turned off and a substantial voltage is developed across it, then the output of operational amplifier 340b is forced low. As the voltage across main transistor switch falls during the notch time, the voltage applied to the negative input of operational amplifier 340b will fall below the reference voltage applied to the positive input and the output of operational amplifier 340b will become an open collector again.

If the outputs of operational amplifiers 340a and 340b are both open collectors, such as can occur when the main transistor switch collector voltage falls below a certain predetermined value during the notch period, then pull-up resistor 344 pulls these outputs high and current flows through resistor 339 and diode 365, turning on transistor 366, in base drive circuit 230, and hence turning on main transistor switch 158. If either of the outputs of operational amplifiers 340a or 340b is forced low, then the other output will be pulled low and these outputs will have no effect on the turn-on of transistor 366.

Thr purpose of the phase delay introduced by resistor 336 and capacitor 338 is to ensure that when the main transistor switch 158 is first turned off and there is very little voltage across it, it is not immediately turned back on again, as would occur without the phase delay. With the phase delay of 200 microseconds, the output of operational amplifier 340a does not become an open collector until after the voltage across main transistor switch 158 is greater than the above-mentioned predetermined value.

A further portion of voltage sensing circuit 170 is comprised of operational amplifier 340c and associated components. The positive input of operational amplifier 340c is connected to a reference voltage of half the supply voltage. Resistors 347, 348 and 349 form a potential divider which applies a portion of the collector-emitter voltage across main transistor switch 158 to the negative input of operational amplifier 340c. With no voltage or a low voltage across main transistor switch 158, the input voltage on the negative input of operational amplifier 340c is less than the reference voltage, and the output of operational amplifier 340c is an open collector. In the preferred embodiment, whenever the collector-emitter voltage of main transistor switch 158 exceeds 80 V, the values of the resistors in the potential divider, formed by resistors 347, 348 and 349, are such that the voltage applied to the negative input of operational amplifier 340c will be greater than the voltage equal to half of the supply voltage that is applied to the positive input. Hence, the output of operational amplifier 340c will be forced low, removing base drive from transistor 366 and hence turning the main transistor switch 158 off. The output of operational amplifier 340c does not become an open collector again until the voltage across main transistor switch 158 falls below 80 V. This portion of the voltage sensing circuit limits the energy that main transistor switch 158 must dissipate while it is in current limiting mode (see below), while still allowing a proper waveform for good dimming. Diodes 346 and 345 protect the negative input terminals of operational amplifiers 340c and 340b, respectively, by clamping the maximum voltage possible at these inputs to the supply voltage.

Base drive circuit 230 comprises transistors 366 and 368 and resistors 367, 377, 378 and 375. Main transistor switch 158 comprises transistors 379 and 380 in a Darlington configuration. A Darlington arrangement is used to lower the power demand on the base drive power supply. Base current is provided to transistors 379 and 380 through base resistors 377 and 378, and resistor 375 from the unregulated 10 V DC supply, in the absence of any base drive signal. This is the situation when transistor 366 has been turned on, which causes transistor 368 to turn off. When transistor 366 is turned off, transistor 368 turns on, receiving base current through base resistor 367 and shunting base drive current away from main transistor switch 158, and turning it off.

Current limit circuit 220 comprises resistors 381, 382, 376, 374, 373, 372 and 370, Zener diode 371 and transistor 369. With normal amounts of current flowing in main transistor switch 158, the base of transistor 369 is held below the emitter by Zener diode 371. As the current flowing in main transistor switch 158 increases, the voltage drop across resistors 381 and 382 increases and transistor 380 tends to heat up, decreasing the voltage drop across the base-emitter junction. This sum of these voltages is divided down by the potential divider formed by resistors 374, 373 and 372 and applied to the base of transistor 369. When the current in main transistor switch 158 rises above a predetermined value, set by adjusting resistor 373, sufficient voltage is applied to the base of transistor 369 to turn it on. This removes the base drive from main transistor switch 158, which begins to turn off. Then the current in main transistor switch 158 falls until transistor 369 is no longer biased on. Main transistor switch 158 will then turn on again. The net result of this feedback action is to limit the current in main transistor switch 158 to the predetermined value, with main transistor switch 158 being in its active region. The inclusion of the base-emitter voltage of transistor 380 in the sensed voltage has been found useful in stabilizing this feedback loop, especially where there are large variations in operating temperature. Current limit circuit 220 also serves to limit the rate of discharging of capacitor 200.

Capacitor 200 is the main divertor for the preferred embodiment of the invention. It is placed in series with the input hot and load hot leads. Bypass switch 384 enables main transistor switch 158 to be shorted out during system installation and check-out, hence protecting it from any faults due to wiring errors. Metal-oxide varistor (MOV) 202 protects main transistor switch 158 from high-energy voltage transients. MOV 210 protects the control circuits from similar transients. Full-wave bridge 383 corresponds to the bridge in FIG. 11.

Transformer 150 provides power for base drive power supply 152 and low-voltage power supply 160. The secondary winding of transformer 150 is center-tapped. The output voltage across the entire secondary winding is applied to the AC terminals of full-wave bridge 385. The output of bridge 385 is connected to series-connected filter capacitors 386 and 387. The junction between the capacitors 386 and 387 is connected to the center tap on the secondary winding of transformer 150. One terminal of capacitor 386 is connected to circuit common. In the preferred embodiment, an unregulated voltage of about 5 V DC is developed across capacitor 386 and an unregulated voltage of about 10 V DC is developed across the series combination of capacitors 386 and 387. These voltages are used to provide base drive for main transistor switch 158, and coil voltage for relay 180.

The unregulated 10 V DC is applied to the input of voltage regulator 389. The regulated voltage of 8 V in the preferred embodiment is filtered by capacitor 390 and used to power the control circuitry. Diode 388 protects regulator 389 in the event that the input voltage becomes less than the output voltage under turn off transient conditions.

Fault protection circuit 164 is comprised of operational amplifiers 340d and 315d and their associated components. The positive input of operational amplifier 340d is connected to a reference voltage of half the supply voltage. The negative input of operational amplifier 340d is connected to the output of an integrating circuit formed by resistors 352, 353 and 354; capacitors 351 and 355 and diode 350. The voltage at the collector of main transistor switch 158 is applied to the anode of diode 350, and is used to charge capacitor 351. Together diode 350 and capacitor 351 form a peak voltage detection circuit. The voltage on capacitor 351 is divided down by the voltage divider comprised of resistors 352, 353 and 354 and applied to the negative input of operational amplifier 340d. Capacitor 355 forms a low-pass filter with resistors 352, 353 and 354. The net effect is that the voltage applied to the negative input of operational amplifier 340d is the integration of the peaks of 10 to 15 half cycles of the collector voltage of main transistor switch 158.

Normally, the voltage at the negative input to operational amplifier 340d is below the reference voltage applied to the positive input, and the output of the operational amplifier is an open collector. Under fault conditions, such as operating the power controller with lamps removed, the voltage at the negative input rises above the reference voltage and the output of operational amplifier 340d is forced low.

The output of operational amplifier 340d is connected to the positive input of operational amplifier 315d. Resistor 331 and capacitor 330 are also connected to the positive input of operational amplifier 315d. Under steady-state conditions, capacitor 330 is charged up to the supply voltage. When the output of operational amplifier 340d is forced low, capacitor 330 is discharged to zero volts. Once the output of operational amplifier 340d becomes an open collector again, capacitor 330 charges up, through resistor 331, to the supply voltage.

The negative input of operational amplifier 315d is connected to a saw-tooth waveform generated by operational amplifier 315a and associated components. Capacitor 310 and resistor 311 differentiate the output signal from optocoupler 308. Diode 312 clamps any negative voltage to ground. Hence, the input voltage to the negative input of operational amplifier 315a is a positive-going trigger synched to the output of optocoupler 308 going high, which in turn occurs at the zero-crossings of the AC supply voltage.

The positive input of operational amplifier 315a is connected to a reference voltage of half the supply voltage. Hence on receipt of each trigger pulse on the negative input, the output of operational amplifier 315a is driven low. Resistor 313 and capacitor 314 are connected to the output of operational amplifier 315a. When the output is forced low, capacitor 314 discharges. When the output becomes an open collector again, capacitor 314 charges up through resistor 313, until the next trigger pulse is received at the negative input. Hence, the output voltage of operational amplifier 315a is a saw-tooth waveform synched to the zero crossings of the AC supply voltage.

As noted above, under steady-state conditions, the positive input to operational amplifier 315d is at supply voltage. In the preferred embodiment, the sawtooth waveform applied to the negative input ramps up to above two-thirds supply voltage. Hence, the output of operational amplifier 315d is an open collector and is normally pulled high by pull-up resistor 332 under steady-state conditions.

Under fault conditions, the input voltage on the positive input to operational amplifier 315d is forced to zero volts. Hence, the output of operational amplifier 315d is forced low, and base drive is removed from transistor 366 regardless of the output from optocoupler 308. After the fault is cleared, the output of operational amplifier 340d becomes an open collector. This allows capacitor 330 to charge up over a period of several half cycles. This slowly rising capacitor voltage is compared to the sawtooth waveform at the output of operational amplifier 315a. The output of operational amplifier 315d thus becomes an open collector at the beginning of each half cycle and stays that way for increasingly longer periods of time in each half cycle as capacitor 330 charges up, allowing base drive to be applied to transistor 366 for longer and longer periods of time in each half cycle. This ensures a safe transition to normal operation when the output voltage from optocoupler 308 controls the turn-off time of transistor 366.

Operational amplifiers 362a and 362b and their associated components form a start-up sequence circuit, which causes the lamps to turn on at full light output and then gradually fade down to the level set on the user adjustable control means. In the preferred embodiment, this fade-down occurs over a period of about three seconds.

The negative input of operational amplifier 362b is connected to the sawtooth waveform generated at the output of operational amplifier 315a. The positive input of operational amplifier 362b is connected to capacitor 361, the other terminal of which is connected to circuit common. With no control signal present at terminal 300, capacitor 361 charges up to the supply voltage through resistor 358 and diode 360. Hence, the voltage present at the positive input to operational amplifier 362b is greater than the sawtooth voltage present at the negative input at all times and the output of operational amplifier 362b is an open collector. This is pulled up to the supply voltage by pull-up resistor 364 and base current is supplied to transistor 366 through resistor 363 and diode 365, turning it on, and hence turning on main transistor switch 158 for each entire half cycle.

quence circuit no longer has any effect on the output voltage waveform.

Operational amplifier 362a provides a defeat function for a portion of the voltage sensing circuit 170 under initial turn-on conditions.

The negative input of operational amplifier 362a is connected to capacitor 361. Hence, the voltage at this point is initially that of the supply and it slowly falls to zero over the course of a few seconds. The positive input of operational amplifier 362a is connected to a reference voltage of about one-third of the supply voltage. Initially, therefore, the output of operational amplifier 362a is forced low. This forces the outputs of operational amplifiers 340a and 340b low, preventing them from turning transistor 366 on. Once capacitor 361 discharges below the reference voltage, the output of operational amplifier 362a becomes an open collector and operational amplifiers 340a and 340b can function in their normal manner.

This defeat function prevents voltage sensing circuit 170 from prematurely turning the main transistor switch 158 on under start up conditions when the voltage across 158 is expected to be low.

The presently preferred values of the resistors and capacitors of the circuit of FIG. 20 are given in Table 2 below. All resistors need be no greater than a 0.5 W power rating unless otherwise noted.

TABLE 2

| Resistor | Value in Ohms | Resistor | Value in Ohms | Capacitor | Value | Voltage Rating |
|---|---|---|---|---|---|---|
| 302 | 1K | 343 | 110K | 200 | 18 μf | 200 V |
| 304 | 33K | 344 | 110K | 303 | 0.1 μf | 250 V |
| 305 | 33K | 347 | 10K | 306 | 2.2 μf | 50 V |
| 307 | 1K | 348 | 110K | 310 | 1,000 pf | 50 V |
| 309 | 10K | 349 | 110K | 314 | 0.1 μf | 50 V |
| 311 | 100K | 352 | 110K | 320 | 0.1 μf | 50 V |
| 313 | 100K | 353 | 110K | 330 | 10 μf | 50 V |
| 316 | 10K | 354 | 10K (vbl.) | 338 | 3,300 pf | 50 V |
| 317 | 10K | 356 | 10K | 351 | 0.33 μf | 600 V |
| 318 | 10K | 358 | 10K | 355 | 100 μf | 50 V |
| 321 | 820K | 359 | 1 M | 361 | 4.7 μf | 50 V |
| 322 | 10K | 363 | 10K | 386 | 2,200 μf | 10 V |
| 323 | 10K | 364 | 10K | 387 | 2,200 μf | 10 V |
| 324 | 4.7K | 367 | 1K | 390 | 4.7 μf | 50 V |
| 325 | 10K | 370 | 100 | | | |
| 327 | 1K | 372 | 100 | | | |
| 331 | 100K | 373 | 20 (vbl.) | | | |
| 332 | 10K | 374 | 22 | | | |
| 333 | 10K | 375 | 1K | | | |
| 336 | 100K | 376 | 100 | | | |
| 337 | 10K | 377 | 47 (2W) | | | |
| 339 | 10K | 378 | 47 (2W) | | | |
| 341 | 100K | 381 | 0.13 (3W) | | | |
| 342 | 110K | 382 | 0.13 (3W) | | | |

As described above, whenever a control signal is present at terminal 300, the output of operational amplifier 315c goes high. Hence, current flows through resistor 356, turning on transistor 357. Thus, capacitor 361 is able to discharge through resistor 359. In the preferred embodiment, it takes several seconds for this to occur. As capacitor 361 discharges, there will be increasing portions in each half cycle when the sawtooth voltage applied to the negative input of operational amplifier 362b is greater than the capacitor voltage and the output of operational amplifier 362b is forced low, turning off transistor 366 and main transistor switch 158. Hence, the notch in the output voltage waveform is gradually opened up. At some point in the process, the output signal from optocoupler 308 will dominate, calling for base current later in each half cycle than the output from operational amplifier 362b and the start up se- Bridges 301 and 385 are rated at 1 Amp 600 V. Bridge 383 is rated at 10 A 600 V. Optocoupler 308 is a General Electric H11L1. Diodes 312, 319, 334, 335, 345, 346, 360, 365 and 388 are type 1N914. Diode 329 is a type 1N404. Diode 350 is rated at 1 A 600 V. Zener diode 371 has a breakover voltage of 2.5 V. Transistors 326, 357 and 366 are type 2N4123. Transistor 328 is a type MJE170. Transistors 368 and 369 are type MJE182. Transistors 379 and 380 are type 2SC3307. Operational amplifiers 315a, 315b, 315c and 315d are together an LM339. Similarly, operational amplifiers 340a, 340b, 340c and 340d are together another LM339. Operational amplifiers 362a and 362b together form an LM2903. Voltage regulator 389 has an output voltage of 8 volts. Transformer 150 has a 120 V primary winding and a 10 V center-tapped secondary winding. Metal-oxide varistor 202 is a General Electric V320LA15A. Metal-oxide varistor 210 is a Panasonic 20K221U. Relay 180 has a 6 V DC coil and has contacts with a current rating of 15 A.

The present invention may be embodied in other specific forms without departing from the spirit or essential attributes thereof and accordingly reference should be made to the appended claims, rather than to the foregoing specification, as indicating the scope of the invention.

What is claimed is:

1. A power control system comprising:
 (a) a control circuit having an input terminal and an output terminal, said control circuit receiving an input AC voltage at said input terminal and supplying an output AC voltage at said output terminal, said control circuit including:
  (1) a switching element interconnecting said input and output terminals,
  (2) main energy diverting means connected for diverting energy to said output terminal;
  (3) variable energy diverting means connected to said output terminal for diverting a controllable amount of energy to said output terminal; and
  (4) means for controlling said switching element and said variable energy diverting means;
 said variable energy diverting means being activated by said control circuit to divert energy during a controllable period of time while the switching element is off, for controlling the output waveform of said output AC voltage.

2. A system as in claim 1, said variable energy diverting means being activated immediately after the turning off of said switching element.

3. A system as in claim 2, said variable energy diverting means further being activated immediately before the turning on of said switching element.

4. A system as in claim 1, said variable energy diverting means being activated immediately before the turning on of said switching element.

5. A system as in claim 1, wherein said main energy diverting means is connected to said input terminal.

6. A system as in claim 1, wherein said variable energy diverting means is connected in parallel with said main energy diverting means.

7. A system as in claim 1, wherein said main energy diverting means comprises an impedance element.

8. A system as in claim 7, wherein said impedance element is a capacitor.

9. A system as in claim 1, wherein said variable energy diverting means comprises a controllably conductive device that is operable for limiting the amount of current that it conducts so as to control said amount of energy diverted.

10. A system as in claim 9, wherein said controllably conductive device includes at least one power transistor.

11. A system as in claim 9, wherein said controllably conductive device includes at least one SCR.

12. A system as in claim 9, wherein said switching element comprises said controllably conductive device which is further operable for switching said current on and off.

13. A power control system as in claim 1, wherein said output voltage has a maximum rate of change of about 2 volts per microsecond when said variable energy divertor means is activated.

14. A power control system as in claim 12, wherein an instantaneous magnitude of the output terminal voltage is greater than about two-thirds of an instantaneous magnitude of the input terminal voltage for at least half the combined time period during which said controllably conductive device is either turned off or operated for limiting said current.

15. A power control system as in claim 1, wherein the efficiency of said system is greater than 90%, efficiency being defined as the ratio of power output at said output terminals to the power input at said input terminals.

16. A power control system comprising:
 (a) a control circuit having input and output terminals, said control circuit receiving an input AC voltage at said input terminals and supplying an output AC voltage at said output terminals, said control circuit comprising:
  (1) a switching element having a fully conducting state; and
  (2) variable energy diverting means which can divert variable amounts of energy to said output terminals when said switching element is not in its fully conducting state; and
  (3) means for controlling said variable energy diverting means as a function of a sensed circuit parameter of said control circuit;
 wherein said parameter is said output AC voltage.

17. A system as in claim 16, wherein said variable energy diverting means comprises a fixed impedance element which is connected in said control circuit for a variable time period.

18. A system as in claim 16, wherein said variable energy diverting means includes a controllably conductive device and the amount of energy diverted is controlled by varying the conductivity of said controllably conductive device.

19. A system as in claim 18, wherein said variable energy diverting means comprises a fixed impedance element which is connected in said control circuit for a variable time period.

20. A system as in claim 18, wherein said controllably conductive device includes at least one power transistor.

21. A system as in claim 18, wherein said controllably conductive device includes at least one SCR.

22. A system as in claim 18, wherein said switching element, comprises said controllably conductive device.

23. A system as in claim 18, wherein said amount of energy diverted is further controlled by connecting said variable energy diverting means in said control circuit for a variable time period.

24. A power control system comprising:
 (a) a control circuit having input and output terminals, said control circuit receiving an input AC voltage at said input terminals and supplying an output AC voltage at said output terminals, said control circuit comprising:
  (1) a switching element having a fully conducting state; and
  (2) variable energy diverting means which can divert variable amounts of energy to said output terminals when said switching element is not in its fully conducting state; and
  (3) means for controlling said variable energy diverting means as a function of a sensed circuit parameter of said control circuit;
 wherein said parameter is said input AC voltage.

25. A system as in claim 24, wherein said variable energy diverting means comprises a fixed impedance element which is connected in said control circuit for a variable time period.

26. A system as in claim 24, wherein said variable energy diverting means includes a controllably conductive device and the amount of energy diverted is controlled by varying the conductivity of said controllably conductive device.

27. A power control system comprising:
(a) a control circuit having input and output terminals, said control circuit receiving an input AC voltage at said input terminals and supplying an output AC voltage at said output terminals, said control circuit comprising:
(1) a switching element having a fully conducting state;
(2) variable energy diverting means which can divert variable amounts of energy to said output terminals when said switching element is not in its fully conducting state; and
(3) means for controlling said variable energy diverting means as a function of a sensed circuit parameter of said control circuit;
wherein said parameter is an output current at said output terminals.

28. A system as in claim 27, wherein said variable energy diverting means comprises a fixed impedance element which is connected in said control circuit for a variable time period.

29. A system as in claim 27, wherein said variable energy diverting means includes a controllably conductive device and the amount of energy diverted is controlled by varying the conductivity of said controllably conductive device.

30. A method of controlling the power from an AC source that is supplied to a load, comprising the steps of:
(1) closing a switch element in series circuit relationship with said source and said load;
(2) opening said switch element after a first predetermined period of time and activating a main energy divertor to divert energy to said load;
(3) activating a variable energy divertor after a second predetermined period of time to divert additional energy to said load;
(4) stopping said diverting of energy by said main energy divertor and said variable energy divertor by closing said switch element; and
(5) repeating steps (2) through (4) at least once for each half-cycle of the AC source voltage.

31. A method as in claim 30, wherein step (3) includes controlling the waveform of the AC power supplied to the load.

32. A power control system comprising:
(a) a load; and
(b) a power control circuit having
(1) a pair of input terminals for receiving an input AC voltage from a power source and a pair of output terminals for supplying an output AC voltage to said load;
(2) main energy diverting means connected to at least one of said output terminals; and
(3) variable energy diverting means connected to at said least one of said output terminals and input terminals, said variable diverting means including a controllably conductive device which has at least three modes of operation, said modes including:
(A) an on mode wherein said output voltage is substantially the same as said input voltage;
(B) an off mode wherein said output voltage is supplied to said output terminals substantially only from energy stored in said main energy diverting means; and
(C) a current source mode wherein the conductance of said controllably conductive device is varied so as to obtain a substantially constant output current through said controllably conductive device during at least part of each cycle of said output AC voltage.

33. A system as in claim 32, wherein said main energy diverting means is further connected to at least one of said input terminals.

34. A system as in claim 32, wherein said variable energy diverting means is connected in parallel with said main energy diverting means.

35. A system as in claim 32, wherein said main energy diverting means comprises a circuit element having an impedance.

36. A system as in claim 35, wherein said element is a capacitor.

37. A system as in claim 36, wherein said controllably conductive device comprises at least one power transistor.

38. A system as in claim 36, wherein said controllably conductive device comprises at least one silicon controlled rectifier.

39. A system as in claim 32, wherein said output voltage has a maximum rate of change of about 2 volts per microsecond when said controllably conductive device is in said current source mode.

40. A system as in claim 32, wherein an instantaneous magnitude of said output voltage is greater than about two-thirds of an instantaneous magnitude of said input voltage for at least half the combined time period during which said controllably conductive device is in said off mode and in said current source mode.

41. A system as in claim 32, wherein the efficiency of said system is greater than 90%, efficiency being defined as the ratio of power output at said output terminals to power input at said input terminals.

42. A system as in claim 32, wherein said load comprises AC ballast means connected to said output terminals, said ballast means driving a gas discharge lamp.

43. A system as in claim 36, wherein said load comprises AC ballast means connected to said output terminals, said ballast means driving a gas discharge lamp.

44. A system as in claim 42, wherein said gas discharge lamp is a rapid start fluorescent lamp.

45. A system as in claim 43, wherein said gas discharge lamp is a rapid start fluorescent lamp.

46. A system as in claim 32, wherein said load comprises a motor connected to said output terminals.

47. A system as in claim 36, wherein said load comprises a motor connected to said output terminals.

48. A system as in claim 32, wherein said load comprises at least one incandescent lamp connected to said output terminals.

49. A system as in claim 36, wherein said load comprises at least one incandescent lamp connected to said output terminals.

50. A system as in claim 32, further comprising a power source including a second said power control circuit for supplying at its output terminals said input AC voltage.

51. A system as in claim 32, further comprising a second said power control circuit, the input terminals of said first-mentioned power control circuit (b) being connected to the input terminals of said second power control circuit, and the output terminals of said first-mentioned power control circuit being connected to the output terminals of said second power control circuit.

52. A power control system for being connected between a source of power providing an AC input voltage and a load for receiving an AC output voltage, comprising a controllably conductive device in series circuit relationship with at least one impedance;

said impedance being insertable between said source of power and said load, during at least one insertion period in each half-cycle of said AC input voltage, said insertion period having a selected phase relationship with said input AC voltage, said insertion period being controlled by controlling the conduction of said controllably conductive device;

the duration of the insertion period and the phase relationship of the beginning of the insertion period to said AC input voltage being variable to allow the power delivered from said source of power to said load to be altered; and the maximum current flowing through said controllably conductive device, after the beginning of the insertion period, being controlled to limit the rate of change of AC output voltage to keep said rate of change below a predetermined value.

53. A system as in claim 52, wherein said duration of said insertion period and said phase relationship of the beginning of said insertion period to said AC input voltage are selected such that the absolute value of the instantaneous AC output voltage during said insertion period is greater than about two-thirds of the absolute value of the instantaneous AC input voltage for at least half of said insertion period.

54. A system as in claim 52, wherein the efficiency of said system is greater than 90%, efficiency being defined as the ratio of the power output at said output AC terminals to the power input at said input AC terminals.

55. A system as in claim 52, wherein there are at least two insertion periods per half-cycle of said input AC voltage, and the maximum change in the output current to said load is kept below a certain predetermined value by controlling the duration of each insertion period.

56. A power control system for receiving at an input terminal an input line voltage and supplying at an output terminal an output load voltage having a predetermined waveform, comprising:
(a) a main divertor connected at least to said output terminal;
(b) a control circuit; and
(c) a variable divertor connected to said input and output terminals, said variable divertor including a controllably conductive device which is controlled by said control circuit to have at least three modes of operation, said modes including:
  (1) an off mode such that said output load voltage is supplied to said output terminal substantially only by said main divertor,
  (2) an on mode such that said output load voltage is substantially the same as said input line voltage, and
  (3) a current source mode wherein the conductance of said controllably conductive device is controlled so as to obtain a transition of said output load voltage between said off mode and said on mode.

57. A system as in claim 56, wherein said main divertor comprises a main impedance.

58. A system as in claim 57, wherein said main impedance is a capacitor.

59. A system as in claim 56, wherein said controllably conductive device includes at least one semiconductor device.

60. A system as in claim 59, wherein said controllably conductive device includes a Darlington pair of semiconductor devices.

61. A system as in claim 56, wherein said main divertor is connected to said input terminal in parallel with said variable divertor.

62. A power control system for receiving AC power input at an input terminal and supplying AC power output having a desired voltage waveform at an output terminal, comprising:
(a) a capacitor interconnecting said input and output terminals;
(b) a variable divertor circuit interconnecting said input and output terminals in parallel with said capacitor, said variable divertor circuit including:
  (1) a series connection of a semiconductor element and an impedance, said series connection being connected in parallel with said capacitor;
  (2) a drive circuit for driving the semiconductor element so as to control its conductance;
  (3) a circuit for sensing the current carried by said semiconductor element and limiting such current by providing a current-limiting signal to said drive circuit;
  (4) a circuit for sensing the voltage across said semiconductor element and generating a voltage-indicating signal;
  (5) a circuit for determining whether said voltage sensed by said voltage sensing circuit is excessive and in response generating a fault protection signal; and
  (6) a notch position circuit for receiving said voltage-indicating signal and said fault protection signal and providing a control signal for controlling said drive circuit to generate said desired output voltage form;
(c) a phase control circuit for being operated by a user so as to generate a phase control signal representative of said desired output voltage waveform; and
(d) a phase control interface for receiving said phase control signal and in response providing a notch position control signal to said notch position circuit for further controlling said drive circuit to generate said output voltage waveform.

* * * * *